United States Patent [19]
Seguchi et al.

[11] Patent Number: 5,744,895
[45] Date of Patent: Apr. 28, 1998

[54] SYSTEM FOR DRIVING ELECTRIC VEHICLES

[75] Inventors: Masahiro Seguchi, Obu; Keiichiro Banzai, Toyota; Hiroaki Kajiura, Nagoya; Akio Yasuda, Kosai, all of Japan

[73] Assignee: Nippondenso Co., Ltd., Kariya, Japan

[21] Appl. No.: 675,129

[22] Filed: Jul. 3, 1996

Related U.S. Application Data

[63] Continuation-in-part of Ser. No. 594,413, Jan. 31, 1996, abandoned.

[30] Foreign Application Priority Data

| Jan. 31, 1995 | [JP] | Japan | 07-13699 |
| Jan. 31, 1995 | [JP] | Japan | 07-13700 |
| Feb. 1, 1995 | [JP] | Japan | 7-314508 |
| Jun. 8, 1995 | [JP] | Japan | 07-141744 |
| Jun. 9, 1995 | [JP] | Japan | 07-142991 |
| Jun. 9, 1995 | [JP] | Japan | 7-142993 |
| Jul. 5, 1995 | [JP] | Japan | 7-169605 |
| Oct. 25, 1995 | [JP] | Japan | 7-277654 |
| Oct. 31, 1995 | [JP] | Japan | 7-283775 |
| Dec. 22, 1995 | [JP] | Japan | 7-334605 |
| Mar. 7, 1996 | [JP] | Japan | 8-050585 |

[51] Int. Cl.$^6$ .................. H02K 1/22; H02K 7/20; H02K 47/04; H02K 16/00
[52] U.S. Cl. .................. 310/266; 310/112; 310/113; 310/114; 310/103
[58] Field of Search .................. 310/750, 112, 310/113, 114, 103, 105, 266, 75 D, 162; 290/12, 15, 17

[56] References Cited

U.S. PATENT DOCUMENTS

| 1,227,185 | 5/1917 | Neuland | 310/105 |
| 1,422,243 | 7/1922 | Van Norden | 310/114 |
| 1,458,601 | 6/1923 | Tanner | 310/112 |
| 1,493,853 | 5/1924 | Fraser | 310/286 |
| 1,773,842 | 8/1930 | Neuland | 310/112 |
| 2,666,174 | 1/1954 | Pestarini | 310/114 |
| 3,683,249 | 8/1972 | Shibata | 290/30 R |
| 3,789,281 | 1/1974 | Shibata | 290/12 |
| 4,309,620 | 1/1982 | Bock | 290/17 |
| 4,375,047 | 2/1983 | Nelson et al. | 310/112 |
| 4,407,132 | 10/1983 | Kawakatsu | 60/716 |
| 4,532,447 | 7/1985 | Cibie | 310/114 |
| 5,172,784 | 12/1992 | Varela, Jr. | 310/126 |
| 5,404,063 | 4/1995 | Mills | 310/266 |
| 5,508,574 | 4/1996 | Vlock | 310/113 |

FOREIGN PATENT DOCUMENTS

| 58401/73 | 1/1975 | Australia . |
| 2517137 | 5/1983 | France . |
| 2693527 | 1/1994 | France . |
| 4407666 | 9/1995 | Germany . |
| 47-031773 | 8/1972 | Japan . |
| 51-039813 | 4/1976 | Japan . |
| 58-130704 | 8/1983 | Japan . |
| 60-001069 | 1/1985 | Japan . |
| 7-015805 | 1/1995 | Japan . |
| 2278242 | 11/1994 | United Kingdom . |
| 82/00928 | 3/1982 | WIPO . |

OTHER PUBLICATIONS

Richter: Electric Machine, German Publication printed by Verlag Birkhaeuser in 1954 (see English Abstract).

*Primary Examiner*—Clayton E. LaBalle
*Attorney, Agent, or Firm*—Cushman Darby & Cushman IP Group of Pillsbury Madison & Sutro LLP

[57] ABSTRACT

A T-S converter is composed of a first rotor which has a first control coil, a second rotor and a stator which has a second control coil. The second rotor has a first magnetic field member (such as laminated sheets of ferromagnetic material) which supplies the first control coil with magnetic field and a second magnetic field member (such as laminated sheets of ferromagnetic material) which supplies the second control coil with magnetic field. The first and second control coils are energized to drive the second rotor to rotate at a set speed with a set torque according to vehicle running condition. The first and the second control coil are also energized to generate battery charging current when the vehicle speed is decreased and the second rotor is driven by the vehicle wheels.

27 Claims, 31 Drawing Sheets

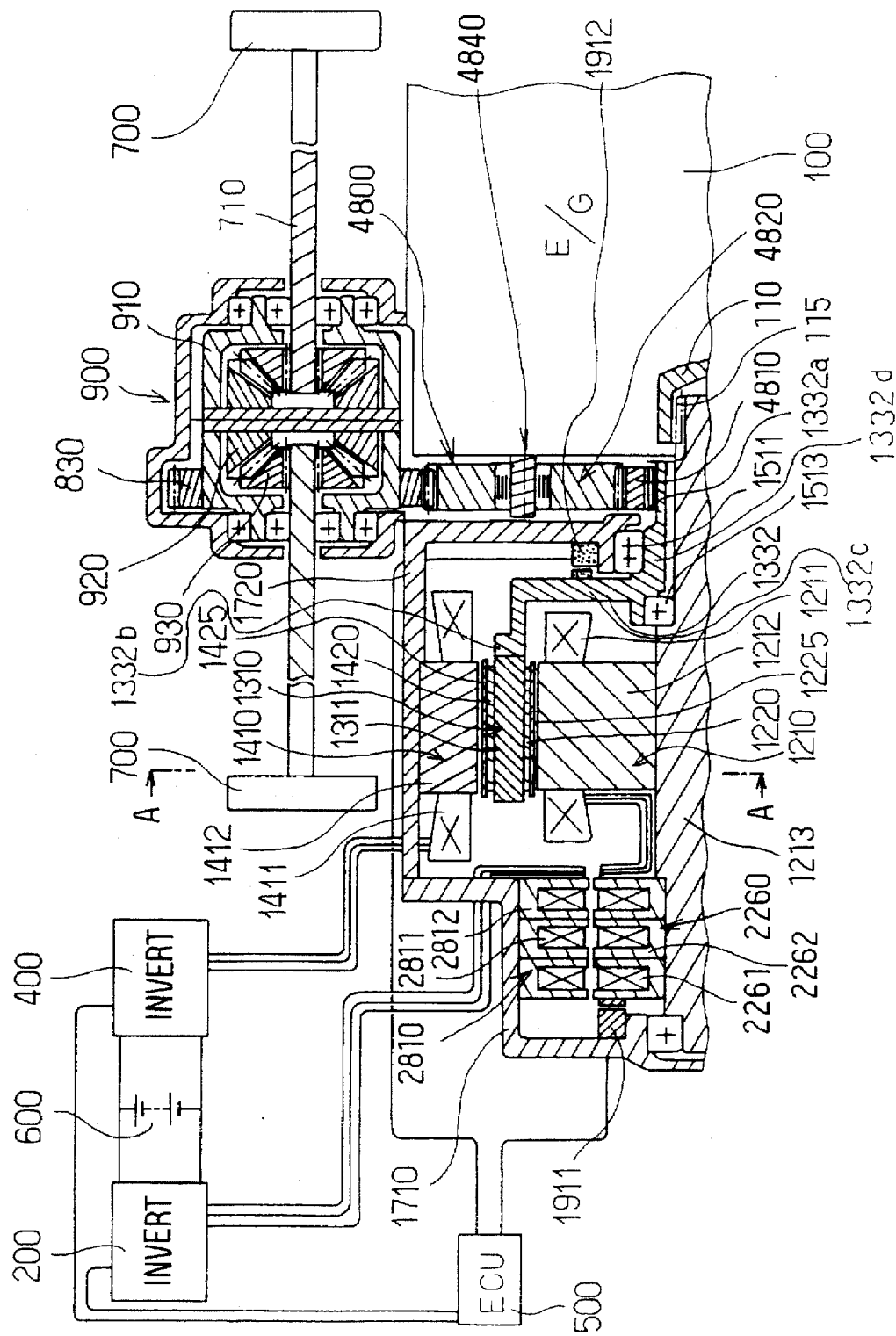

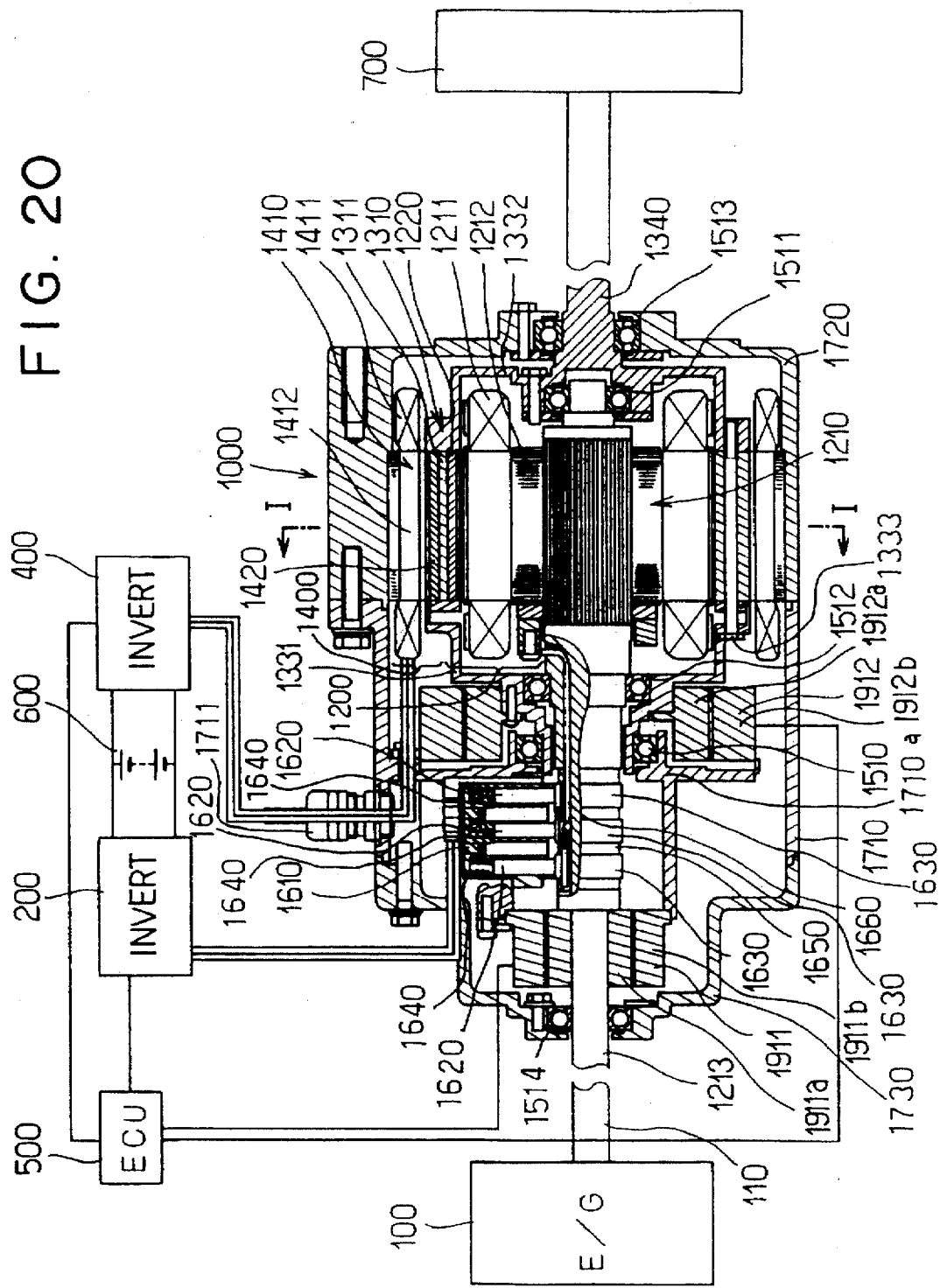

($\alpha = 0°$)

($\alpha = 90°$)

($\alpha = 45°$)

($\alpha = -45°$)

SYSTEM FOR DRIVING ELECTRIC VEHICLES

CROSS REFERENCE TO RELATED APPLICATION

The present application is a continuation in part of application Ser. No. 08/594,413, filed Jan. 31, 1996 now abandoned.

BACKGROUND OF THE INVENTION

1. Field of the Invention

The present invention relates to a system for driving an electric vehicle which converts battery power and engine power to power for driving a vehicle and, more particularly, to a hybrid-type electric-vehicle-driving system with electric power generated by an internal combustion engine.

2. Description of Related Art

Japanese Patent Laid-Open Publications Sho 51-39813 and 60-1069 disclose a hybrid-type electric-vehicle-driving system with the electric power generated from an internal combustion engine. Such an electric-vehicle-driving system is composed of a generator which is mechanically connected to a drive shaft of an internal combustion engine, an electric motor for driving vehicle wheels, battery unit for storing electric power of the generator and energizing the electric motor and a control unit for regenerating electric power by the electric motor when the vehicle speed is reduced.

However, since all the driving power of the above conventional system is applied to the wheels through electric power system including the generator, the battery unit and the motor, the power system is necessarily required to have a large size. In addition, since the energy conversion is made a plurality of times, the total efficiency of the system is not so high.

Japanese Patent Laid-Open Sho 58-130704 discloses a torque-speed converting system, in which engine power is converted into electromagnetic induction force and transmitted to the vehicle wheels by a wheel-drive motor having control coils and, as required, electric power is supplied from a battery to the wheel-drive motor, or kinetic energy of the vehicle is converted by the wheel-drive motor (functions as a generator) to electric power to be stored into a gyro wheel.

However, since the frequency of the induction current applied to the control coils (short-circuited coils) of the drive-motor is proportional to the engine rotational speed and can not be changed, it is not possible to control the rotational speed of the vehicle wheels although the torque can be changed.

SUMMARY OF THE INVENTION

In view of the above described circumstances, it is a primary object of the present invention to provide an improved system for converting battery and engine power to a power for driving a vehicle.

Another object of the present invention is to provide a system for converting electric power of a battery and mechanical power of an engine into driving power of an output shaft at a prescribed rotating torque and rotational speed. Such system compresses a first rotor having a first control coil supported by a bearing; a stator having a second control coil; and a second rotor disposed between the first rotor and the second rotor and having a first magnetic member for providing magnetic field interlinking the first control coil and a second magnetic member for providing magnetic field interlinking the second control coil, the second rotor disposed coaxially with the first rotor to rotatably support the first rotor through the bearing.

Another object of the present invention is to provide a system for converting electric power of a battery and mechanical power of an engine into driving power of an output shaft at a prescribed rotating torque and rotational speed. Such system comprises: a first rotor having a first control coil supported by a first stator fixed to the housing having a second control coil; a second rotor disposed between the first rotor and the second rotor and having a first magnetic member for providing magnetic field interlinking the first control coil and a second magnetic member for providing magnetic field interlinking the second control coil; a first inverter for controlling electric power to be supplied to the first control coil according to torque generated between the first stator and the first rotor; a second inverter for controlling electric power to be supplied to the second control coil according to angular speed difference between the first and second rotors; a second stator having a coil connected to the first inverter; and a third rotor carried by the first rotor and disposed to couple with the second stator for transmitting the electric power controlled by the first inverter from the coil of the second stator to the first control coil.

Another object of the present invention is to provide a system for converting electric power of a battery and mechanical power of an engine into driving power of an output shaft at a prescribed rotating torque and rotational speed. Such system comprises: a first rotor having a permanent magnet; a stator having a second control coil; a second rotor disposed between the first rotor and the second rotor and having a first control coil interlinking the magnetic field of the permanent magnet and a magnetic member for providing magnetic field interlinking the second control coil, the second rotor disposed coaxially with the first rotor to rotatably support the first rotor; and means having slip rings fixed to the first rotor and brushes for supplying electric power from the battery to the first coil.

A further object of the present invention is to provide a system for converting electric power of a battery and mechanical power of an engine into driving power of an output shaft at a prescribed rotating torque and rotational speed. Such system comprises: a speed-torque converter having an input shaft connected to the engine, a first rotor having a first control coil, a stator having a second control coil disposed around the first rotor, a second rotor disposed between the stator and the first rotor and having a first magnetic member for generating magnetic field interlinking the first control coil and a second magnetic member for generating magnetic field interlinking the second control coil, the output shaft disposed coaxially with the input shaft; first means for detecting rotation of the first rotor and the second rotor; second means for supplying the first control coil with electric current according to a rotational speed difference between the first and second rotors; and third means for supplying the second control coils with electric current according to the rotation of second rotors.

Another further object of the present invention is to provide a system which comprises: a speed-torque converter having an input shaft connected to the engine, a first rotor having a first control coil, a stator having a second control coil disposed around the first rotor, a second rotor disposed between the stator and the first rotor and having a first magnetic member for generating magnetic field interlinking the first control coil and a second magnetic member for generating magnetic field interlinking the second control coil, the output shaft disposed coaxially with the input shaft; and the first and second magnetic members provide variable magnetic resistance to change inductances of the first and second control coils when they rotate.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 16 is a schematic cross-sectional side view illustrating a system according to an eighth embodiment of the present invention;

FIG. 20 is a schematic cross-sectional side view illustrating a system according to a tenth embodiment of the present invention;

DETAILED DESCRIPTION OF THE PREFERRED EMBODIMENT (First Embodiment)

Figure 1:
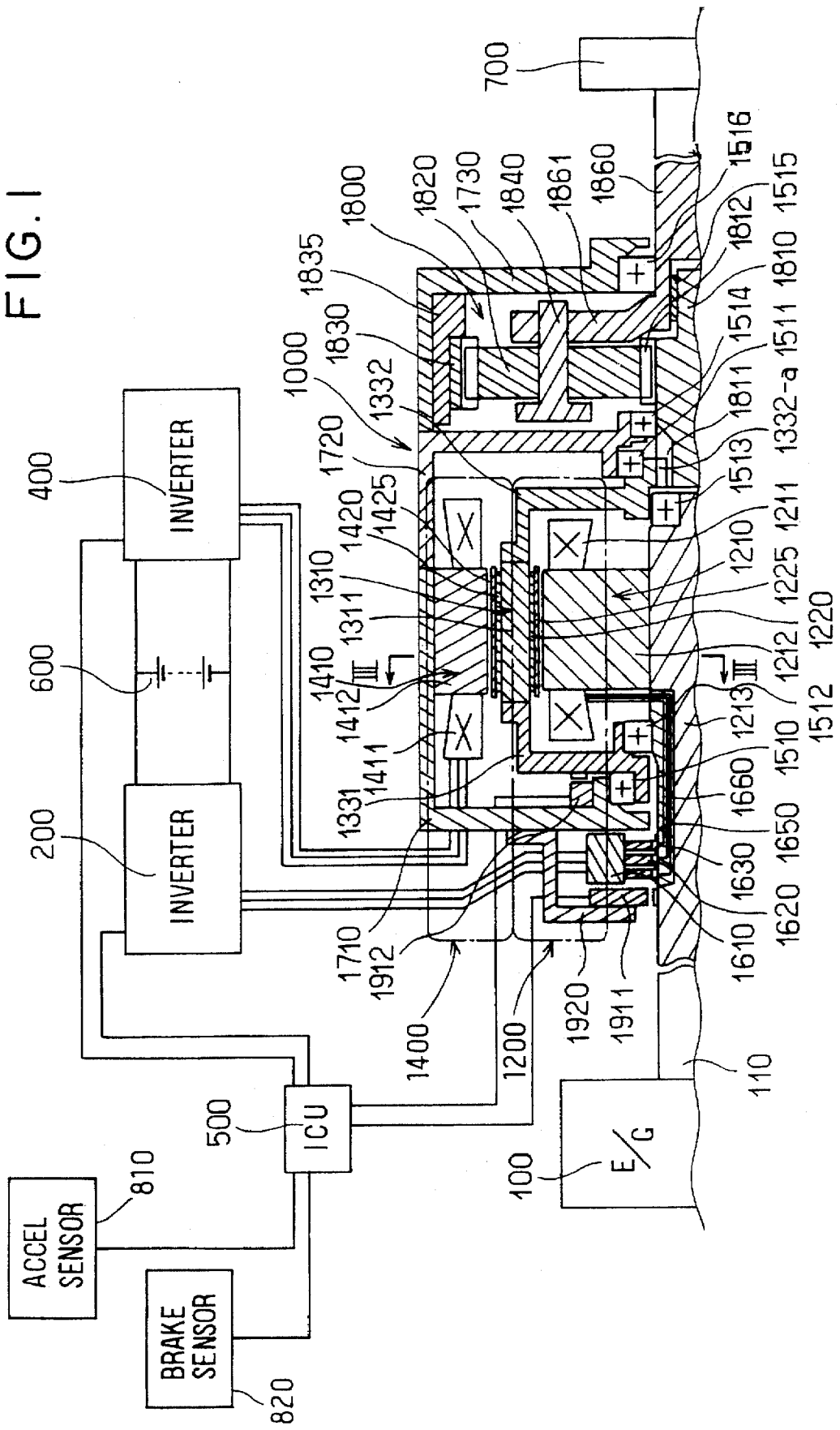
FIG. 1 is a schematic cross-sectional side view illustrating a system according to a first embodiment of the present invention.

A system for driving an electric vehicle according to a first embodiment of the present invention is described with reference to FIG. 1.

A torque-rotational speed converter 1000 (T-S converter) is a driving unit which is driven by an engine 100 to drive vehicle wheels 700 at driving torque and rotational speed controlled according to vehicle driving conditions. The T-S converter is composed of a speed control section 1200 which is a synchronous motor structure to be described later, a torque control section 1400 which is another synchronous motor structure to be described later and a speed reduction section 1800. An inverter 200 has power switching transistors (not shown) therein and converts the DC-current supplied from a battery 600 into three phase AC current, which is supplied to the speed control section 1200 of the T-S converter. The inverter 200 also converts AC current generated by the speed control section 1200 into DC current to charge the battery 600 when the speed control section 1200 is driven by the vehicle wheels 700. An inverter 400 also converts DC current into AC current and AC current into DC current between the battery 600 and the torque control section 1400 of the T-S converter 1000 in the same manner as the inverter 200. An inverter control unit 500 controls the inverters 200 and 400 according to signals transmitted from an accelerator sensor 810, a brake pedal sensor 820, rotation sensors 1911 and 1912 (to be described later) and other sensors. Joint members and speed reduction mechanisms, which are used in the ordinary vehicle, may be disposed between the engine 100 and the T-S converter 1000, and also between the T-S converter 1000 and the wheels 700. An engine shaft 110 of the engine 100 is connected to an input shaft 1213 of the T-S converter 1000 through a coupling (not shown)

The T-S converter 1000 is composed of a pair of cylindrical outer frames 1710 and 1720, a cylindrical first rotor 1210 which is carried by the input shaft 1213, a second rotor 1310 which is rotatably disposed around the first rotor 1210 at a gap and a stator 1410 fixed to an inner periphery of the outer frame 1710. The input shaft 1213 extends from the center of an end of the outer frame 1710 and is connected with the engine shaft 110. The stator 1410 has a stator core and a control coil 1411 which generates a rotating magnetic field when energized by the inverter 400. The first rotor 1210 has a rotor core 1212 and a control coil 1211 which forms a rotating magnetic field. A brush holder 1610, three brushes 1620 and three slip rings 1630 are disposed in a cover case 1920 to supply three phase electric power to the control coil 1211 of the first rotor 1210. Shaft supporting members such as bearings 1510 and 1511 are fixed to the driven shaft 1213. The control coil 1211 and the slip ring 1630 are connected by lead wires 1660 passing under the bearing 1512 with an insulating member 1650. The insulating member 1650 is inserted in a groove formed in the input shaft 1213 so as to go under the bearing 1512. The second rotor 1310 has a hollow rotary yoke 1311 and a plurality of internal permanent magnets 1220 are fixed to the inner periphery thereof by a ring 1225 at an equal interval to provide N and S poles alternately. The hollow rotary yoke 1311 is supported by the outer frames 1710 and 1720 via rotor frames 1331 and 1332 and bearings 1510 and 1511. The input shaft 1213 is rotatably supported by the rotor frames 1331 and 1332 via bearings 1512 and 1513. The permanent magnets 1220, the rotor core 1212 and the control coil 1211 compose a synchronous motor which corresponds to the aforementioned speed control section 1200. The second rotor 1310 also has a plurality of external permanent magnets 1420 fixed to the outer periphery of the hollow rotary yoke 1311 by a ring 1425 at an equal interval to provide N and S poles alternately. The permanent magnets 1420, the stator core 1412 and the control coil 1411 compose a synchronous motor which corresponds to the aforementioned torque control section 1400. The rotation sensors 1911 and 1912 are disposed respectively in the cover case 1920 and in a space between a rotor frame 1331 of the second rotor 1310 and the outer frame 1710. The sensor 1911 and 1912 are connected to the inverter control unit 500 to control rotational speed and torque of the first and second rotors 1210 and 1310 as described later.

The speed reduction Section 1800 of the T-S converter 1000 has a sun gear shaft 1810, a planetary gear 1820, an internal gear 1830, a planetary gear shaft 1840 and an output shaft 1860. An input gear 1811 is formed on an end of the sun gear shaft 1810 in mesh with an internal gear 1332a of a boss portion of the rotor frame 1332. The sun gear shaft 1810 is rotatably supported by the outer frame 1720 and the output shaft 1860 respectively via bearings 1514 and 1515. The rotation is transmitted from the second rotor 1310 to the output shaft 1860 through the sun gear shaft 1810, a sun gear 1812 formed around the sun gear shaft 1810 in mesh with the planetary gear 1820. The rotational speed is reduced by the internal gear 1830 and the planetary gear shaft 1840, and is transmitted to a planetary gear carrier portion 1861 formed integrally with the output shaft 1860. The output shaft 1860 is rotatably supported by a bearing 1516 which is fitted to a boss portion of a frame 1730 of the speed reduction section 1800. The sun gear shaft 1810 and the output shaft 1860 are disposed in line with the input shaft 1213. The internal gear 1830 is fixed to the frame 1730 of the reduction section 1800 via a fixing member 1835.

Operation of the T-S converter 1000 is described with reference to a flow chart shown in FIG. 8.

When the inverter control unit 500 is started, a set-torque Tv for the vehicle wheels 700 is determined according to a signal representing the throttle-open-angle detected by the accelerator sensor 810 and a signal representing brake-pedal-operation detected by the brake pedal sensor 820 in a step S100. Then, angular speeds e of the first rotor 1210 and v of the second rotor 1310 are determined according to signals from the rotation sensors 1911 and 1912 in a step S102. Subsequently, engine torque Te generated by the engine 100 is calculated from the throttle-open-angle signal and the angular speed signal v on the basis of a data map of the inverter control unit 500 (step S104). Transmitting torque Tt which is transmitted between the first rotor 1210 and the second rotor 1310 is determined in the following step. The transmitting torque Tt is set to be equal to the engine torque Te. That is, no addition to or reduction from the engine torque Te is made between the first and second rotors 1210 and 1310 except a slight torque change in order to maintain the drive-stability of the vehicle. In order to eliminate the slight torque change between the first and second rotors 1210 and 1310, rotational speed of the second rotor 1310 is controlled by the inverter 200.

Then toque T2 for the torque control section 1400 to supplement difference between the transmitting torque Tt and the set torque Tv is determined in a step S106. That is, the relationship of the torque is expressed as T2=Tv−Tt=Tv Te. Subsequently, the inverter 400 controls the torque control section 1400 to generate the supplemental torque T2 in a step S108.

Figure 9:
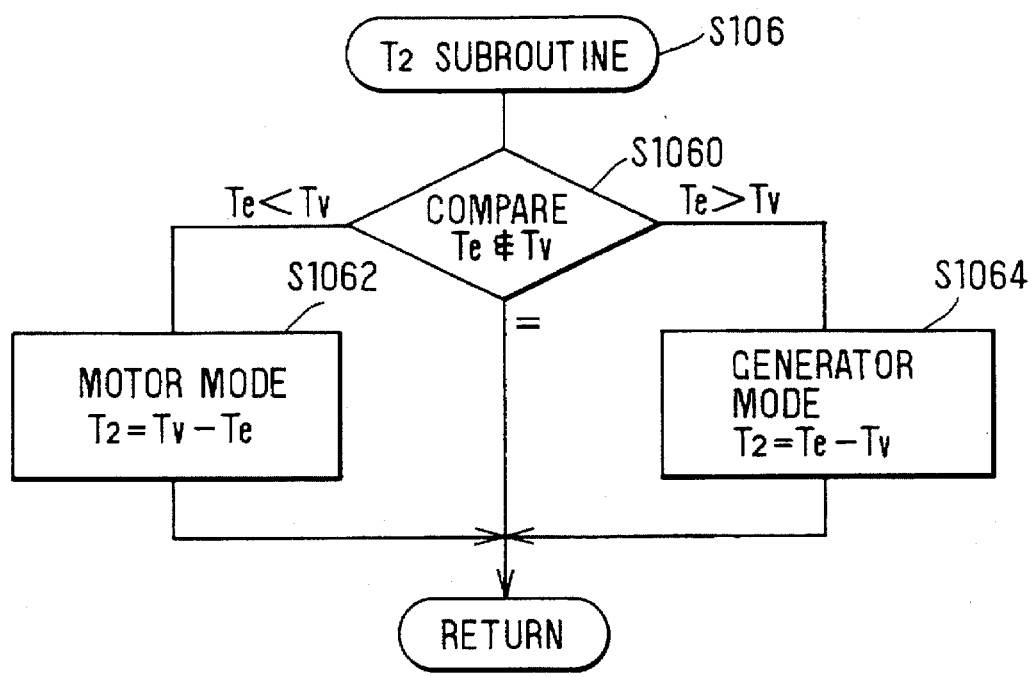
FIG. 9 is a flow chart of a sub-routine of a step in the flow chart shown in FIG. 8.

The torque control section 1400 operates as a generator or a motor according to a difference between the engine torque Te and the set torque Tv in the step S 106 as shown in FIG. 9.

When the engine torque Te is detected smaller than the set torque Te in a step 1060, the process goes to a step 1062 where the torque control section 1400 is controlled to become a wheel-drive motor which generates the torque T2=Tv−Te with power supplied from the inverter 400. If the engine torque Te is detected larger than the set torque Tv on the other hand, the process goes to a step S1064, where the torque control section 1400 is controlled to become a generator which is driven by the torque T2=Te–Tv. If the engine torque Te is equal to the set torque Tv, the torque control section 1400 does not function as a motor or a generator.

Figure 10:
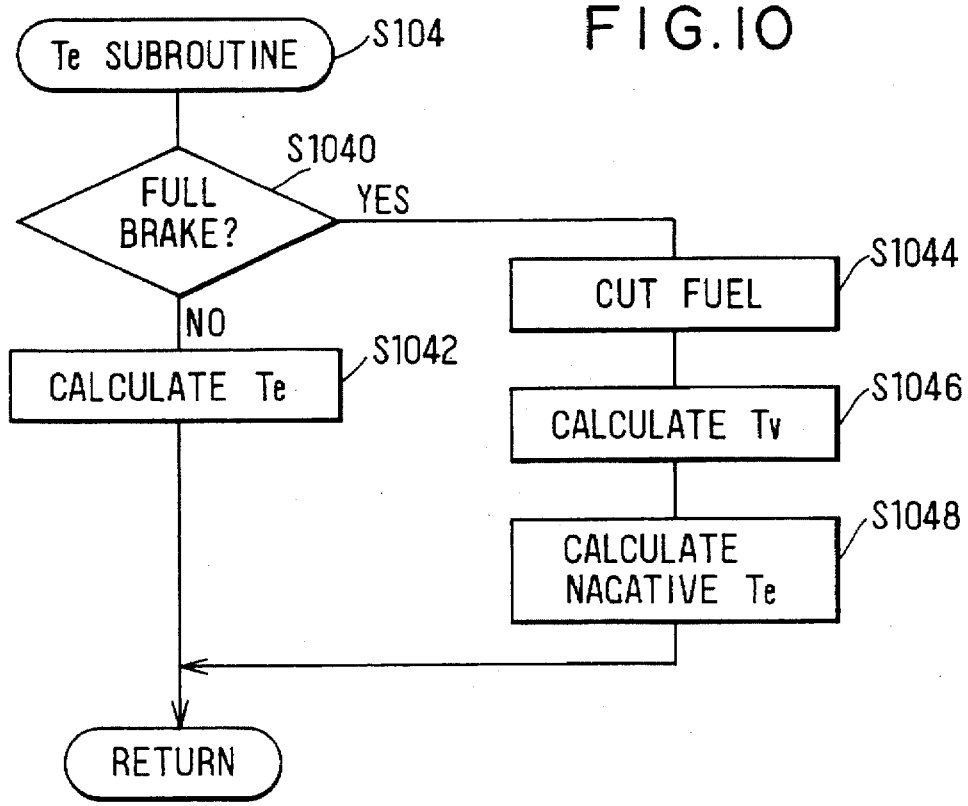
FIG. 10 is a flow chart of a sub-routine of a step in the flow chart shown in FIG. 8.

The engine torque Te may be calculated from the brake-pedal-operation signal transmitted from the brake pedal sensor 820 as shown in FIG. 10. When the vehicle is driven on a steep slope and the brake pedal is operated to a degree more than a predetermined degree, fuel supply to the engine is stopped thereby to stop driving the first rotor 1210 in a step S1044. Then, the set torque Tv is calculated only from the brake pedal signal in a step S1046, and a negative value of the engine torque Tv at an angular speed e is calculated in a step S1048 so that the inverter 400 controls the torque control section 1400 to operate as a regenerative brake.

When the brake pedal is determined to operate within the predetermined degree in the step S1040 on the other hand, the torque Te is calculated in the ordinary manner from the throttle-open-angle signal, the angular speed e and etc. in a step S1042.

Figure 8:
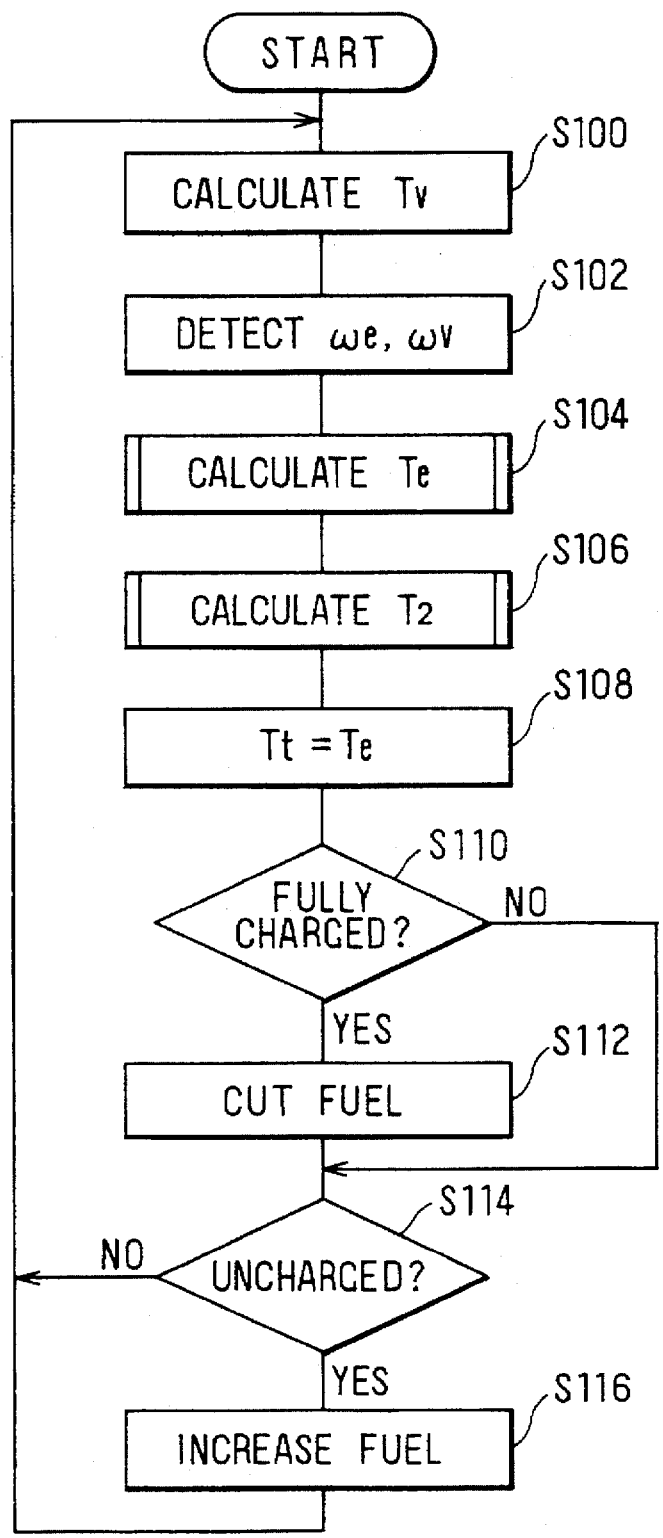
FIG. 8 is a flow chart of steps for controlling a system according to the present invention.

Then, charging state of battery 600 is detected by a well-known manner (for example, by calculating from battery voltage and charging current) in a step S 110 in FIG. 8. If the charging ratio is higher than a maximum value, the control of the first rotor by the inverter 200 is stopped and only the control by the torque control section 1400 is permitted. At this time, the fuel supply to the engine 100 is cut or reduced in a step S112. Then, the process returns to the step S100 if the charging ratio is detected not lower than a minimum value in a step S114. When the battery charging ratio is not higher than the maximum value on the other hand, the process goes to a step S114, and to a step S116 if the battery charging ratio is lower than the minimum value. The process returns to the step S100 after the fuel supply to the engine 100 is increased in the step S116.

The transmitting torque Tt is controlled to substantially equal to the engine torque Te by the speed control section 1200 according to the above embodiment. However, it is possible to control the second rotor 1310 to rotate at a speed higher than the first rotor 1210, while the torque is maintained constant. That is, the frequency of the AC current supplied by the inverter 400 to the stator 1410 is increased to corresponds to the rotational speed of the second rotor and the frequency of the AC current supplied by the inverter 200 to the second rotor 1310 is controlled to correspond to a difference between the rotational speeds of the first rotor 1210 and the second rotor 1310.

Operation of the T-S converter 1000 when the engine rotates at a speed 2n [rpm] with a torque t [N m] and the vehicle runs at a speed n [rpm] with a torque 2t [N m] is described with reference to FIG. 1, FIGS. 2A through 2D and FIG. 3. The speed and the torque of the engine and the vehicle wheels are treated here as if the engine and the wheel were connected directly in order to make the discussion simple.

Since the second rotor 1310 is mechanically connected to the output shaft 1860 via the reduction section 1800, the rotational speed of the second rotor 1310 must be controlled by the speed control section 1200 to correspond to the vehicle speed.

Figure 2A:
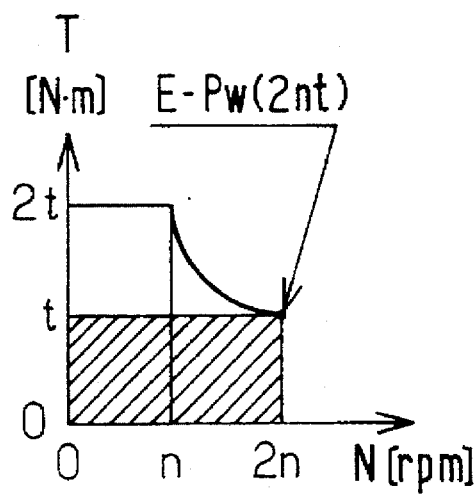
FIGS. 2A, 2B, 2C and 2D are graphs showing how the system according to the first embodiment converts torque and rotational speed of the engine into set torque and rotational speed of the vehicle.

The engine rotation at the speed 2n [rpm] with the torque t [N m] shown in FIG. 2A is transmitted to the input shaft 1213 of the T-S converter 1000 through a coupling (not shown), and to the first rotor 1210. The rotational speed 2n [rpm] of the second rotor 1310 is reduced to n [rpm] by induction force or electromagnetic force of the speed control section 1200 and transmitted to the vehicle wheels 700 as shown in FIG. 2B.

Figure 2B:
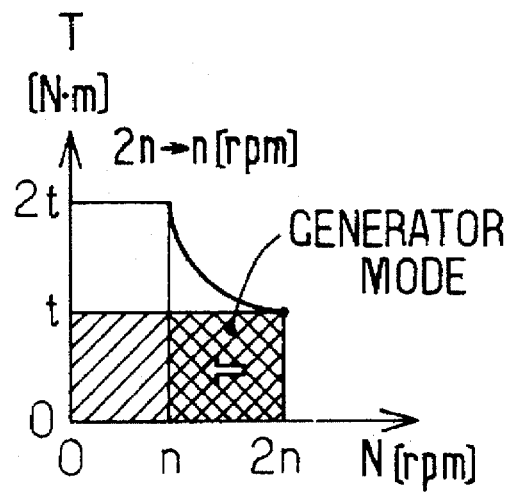
Figure 2C:
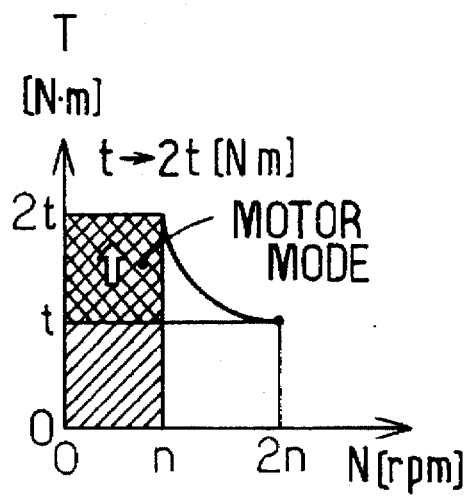
Figure 3:
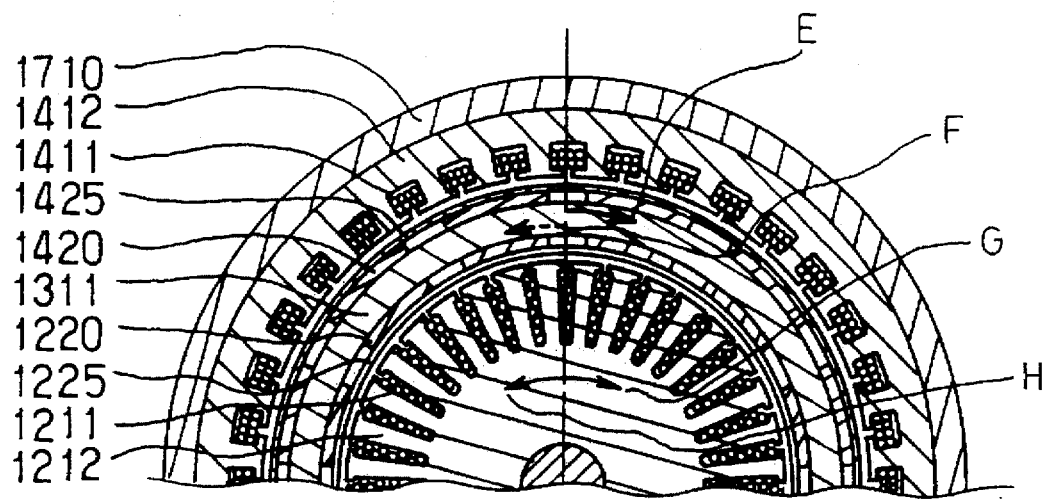
FIG. 3 is a cross-sectional schematic view illustrating a main portion of a T-S converter of the system cut along a line III—III in FIG. 1.

In order to change the speed of the second rotor 1310 from 2n [rpm] to n [rpm] while maintaining the same torque t as shown in FIG. 2B, the direction F of the rotation of the second rotor 1310 relative to the first rotor 1210 becomes opposite to the direction E of the torque of the second rotor as shown in FIG. 3. (Incidentally, an arrow G indicates the direction of the engine torque, and an arrow H indicates the direction of the torque from the vehicle wheels.) The speed control section of the T-S converter 1000 operates in the generating mode at this moment. The rotation of the second rotor 1310 relative to the first rotor 1210 is detected by the rotation sensors 1911 and 1912 and the control coil 1211 of the first rotor 1210 is energized at timing calculated on the basis of the relative rotation. The power generated in the control coil 1211 of the first rotor 1210 is supplied to the battery 600 and to the torque control section 1400 through the slip rings 1630, the brushes 1620. Thus, the second rotor 1310 rotates the output shaft 1860 at the speed n [rpm] with the torque t [N m] to generate energy nt [N m] [rpm] as indicated by cross hatching in FIG. 2B. In other words, the T-S converter 1000 can transmit the driving torque t of the engine to the vehicle wheels 700 without change and generates electric power by the difference in the rotation between the engine 100 and the vehicle wheels 700.

Then, the inverter 400 supplies the stator control coil 1411 of the torque control section 1400 with AC control current at timing calculated from the signal of the rotation sensor 1912 so that the second rotor 1310 can rotate at the speed n [rpm] with the torque 2t [N m]. That is, the torque control section 1400 is energized by the inverter 400 to generate an additional torque t as a motor as indicated by cross-hatching in FIG. 2C. The rotation of the second rotor 1310 is transmitted through the internal gear 1332a of the rotor frame 1332, the input gear 1811 and the reduction section 1800 to the output shaft 1860.

Figure 2D:
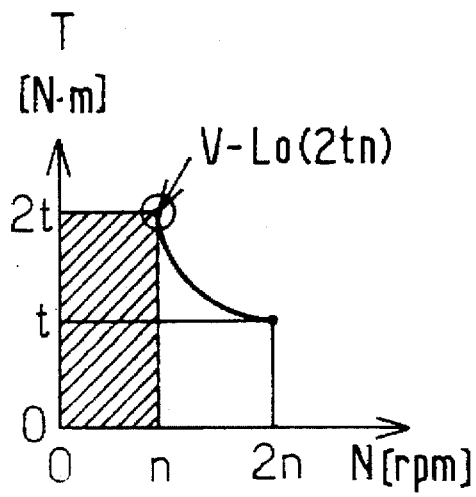

Thus, the power of the engine which rotates at a speed 2n [rpm] with a torque t [N m] as shown in FIG. 2A can be applied to the vehicle runs at a speed n [rpm] with a torque 2t [N m] as shown in FIG. 2D.

The speed control section 1200 can operates as a motor for driving the vehicle wheel if the vehicle requires speed higher than the speed of the engine 100. The torque control section 1400 can operate as a generator for charging battery if the engine torque exceeds torque required by the vehicle.

The conversion of the torque and speed between the engine and the vehicle wheel can be carried out also when the power of the engine and load of the vehicle wheel is different in the same manner as described above. For example, when the vehicle runs on a steep uphill slope, the control unit 500 controls the inverters 200 and 400 to supply electric power to the control coils 1211 and 1411 thereby to assist the engine to drive the vehicle wheels as required. On the other hand, when the vehicle runs on a steep down hill, the control unit 500 controls the inverter 200 and 400 to charge electric power generated by the control coils 1211 and 1411 to the battery.

When the vehicle needs further slow down, the speed control section 1200 connects the wheel to the engine 100 as a brake or a compressor. Thus, torque control section 1400 is not required to have large braking power, resulting in a compact size.

(Second Embodiment)

A system for driving an electric vehicle according to a second embodiment is described with reference to FIG. 4.

The same reference numeral indicates the same or substantially the same part or portion hereinafter and, therefore, detailed description is omitted from descriptions of the following embodiments.

The second rotor 1310 according to the second embodiment has squirrel-cage-conductors 1227 and 1427 instead of the permanent magnets. Accordingly, the second rotor 1310 operates as an induction motor instead of a synchronous motor in the first embodiment.

Figure 4:
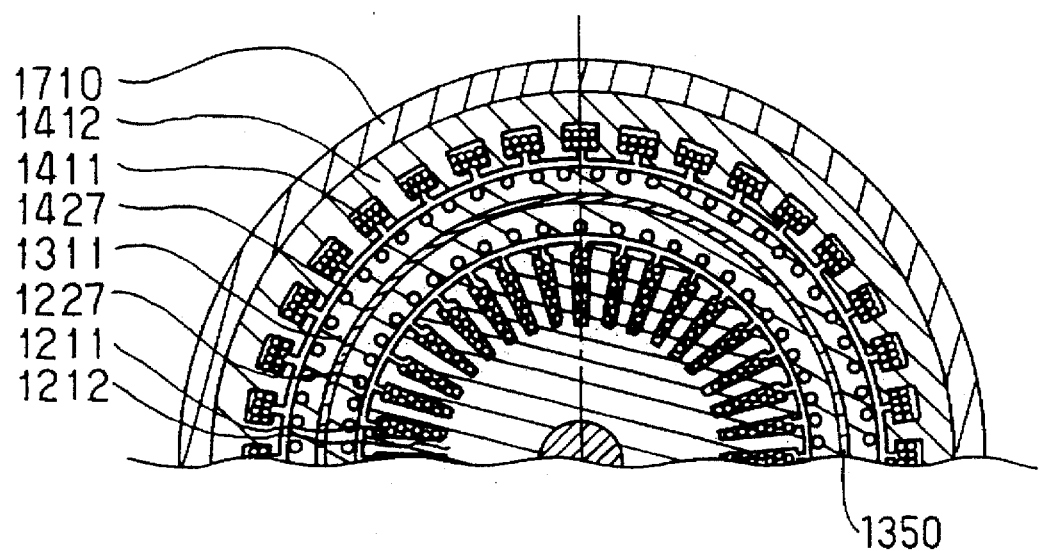
FIG. 4 is a cross-sectional plan view illustrating a main portion of a T-S converter of the system according to the second embodiment.

A cylindrical non-magnetic layer 1350 is disposed between the squirrel-cage-conductors in order to prevent magnetic interference between the speed control section 1200 and the torque control section 1400, as shown in FIG. 4 which is a cross-sectional view illustrating a main portion of the T-S converter 1000.

Since the T-S converter according to the second embodiment is composed of the induction type second rotor 1310, the rotation sensors 1911 and 1912 can be replaced with a crank angle sensor or vehicle speed sensor disposed near the vehicle wheel.

Either one of the squirrel-cage conductors 1227 and 1427 of the second rotor 1310 can be replaced with the permanent magnets as described with regard to the first embodiment.

(Third Embodiment)

A T-S converter 2000 according to a third embodiment is described with reference to FIG. 5 and FIGS. 6A, 6B, 6C and 6D.

A gear 210d is formed on the end of an output shaft 210 of the engine 100 to be in mesh with an internal gear 2332d formed in a frame 2332 of the second rotor 1310 so that the engine power is transmitted to the second rotor 1310 directly. The first rotor 1210 is carried by a shaft 2213 which is disposed in alignment with, but separate from, the engine output shaft. A sun gear 2213d of the speed reduction section 1800 is formed at an end of the shaft 2213 opposite the engine 100.

Driving power is transmitted from the first rotor 1210 through the gear 2213d to the planetary gear 1820. Then, after the rotational speed of the planetary gear 1820 is reduced by the internal gear 1830, the driving power is transmitted through the planetary gear shaft 1840 and the planetary carrier 1861 to the output shaft 1860. The output shaft 1860 is rotatably supported by the bearing 1516 which is fitted to a boss portion of a frame 2730 of the speed reduction section 1800. The internal gear 1830 is fixed to the frame 2730 via the fixing member 1835. The cover case 1920, the rotation sensors 1911 and brush holder 1610 are disposed in the frame 2730 together with the reduction section 1800.

Operation of the T-S converter 2000 is described with reference to FIG. 5, FIGS. 6A through 6D and FIG. 7.

Figure 6A:
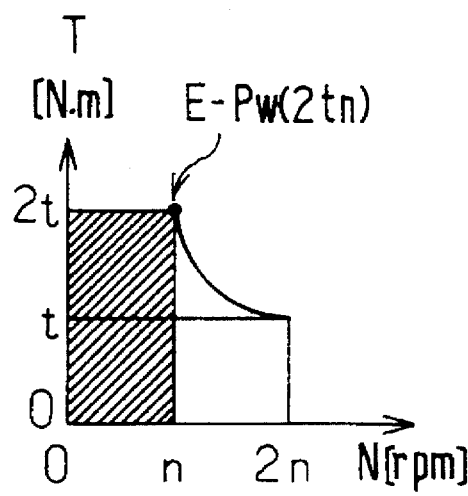
FIGS. 6A, 6B, 6C and 6D are graphs showing how the system according to the third embodiment converts torque and rotational speed of the engine into set torque and rotational speed of the vehicle.
Figure 6B:
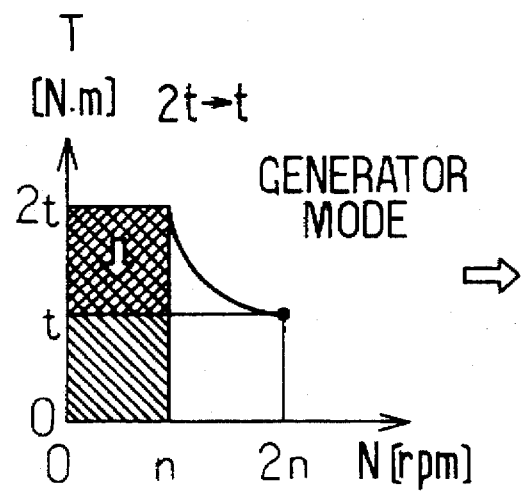
Figure 6C:
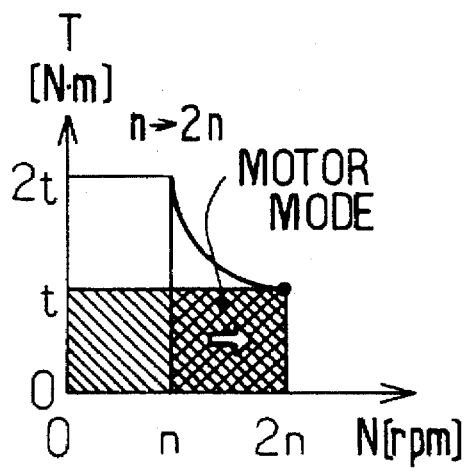
Figure 6D:
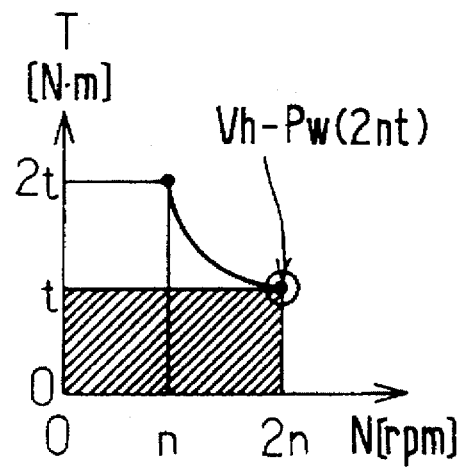

When the engine 100 rotates at a speed n [rpm] with a torque 2t [N m] as shown in FIG. 6A and the vehicle runs at a speed 2n [rpm] with a torque t [N m] as shown in FIG. 6D, the engine rotation is transmitted from the output shaft 210 and a coupling (not shown) through the internal gear 2332d to the second rotor 1310. The inverter 400 supplies the stator control coil 1411 of the torque control section 1400 with AC control current at timing calculated from the signal of the rotation sensor 1912 so that the second rotor 1310 can rotate at the speed n [rpm] with the torque t [N m]. That is, the torque control section 1400 changes the torque 2t [N m] transmitted from the engine 100 to t [N m] as shown in FIG. 6b while maintaining the speed n [rpm] and generates electric power which corresponds to tn [Nm] [rpm]. The generated power is supplied from the control coil 1411 to the battery 600 through the inverter 400.

Then, the torque t of the second rotor 1310 is transmitted to the first rotor 1210 of the speed control section 1200 through the permanent magnets 1220 disposed on the inner periphery of the second rotor 1310.

The rotational speed n [rpm] of the first rotor 1210 is changed to 2n [rpm] by induction force or electromagnetic force of the speed control section 1200 to correspond to the vehicle speed and transmitted to the vehicle wheel 1310 as shown in FIG. 6C. When the speed of the second rotor 1310 is changed from n [rpm] to 2n [rpm] while maintaining the same torque t as shown in FIG. 6C, the direction of the rotation of the first rotor is the same as the direction of the rotation of the second rotor 1310 and, therefore, the T-S converter 2000 operates in the motor mode. The rotation of the first rotor 1210 relative to the second rotor 1310 is detected by the rotation sensors 1911 and 1912 to energize the control coil 1211 of the first rotor 1210 at timing calculated on the basis of the relative rotation, and electric power is supplied to the speed control section 1200 by the inverter 200. The first rotor 1210 rotates at the speed 2n [rpm] with the torque t [N m] by consuming energy nt [N m] [rpm] of the battery as indicated by cross hatching in FIG. 6C.

Thus, the power of the engine which rotates at a speed n [rpm] with a torque 2t [N m] as shown in FIG. 6A can be applied to the vehicle which runs at a speed 2n [rpm] with a torque t [N m] as shown in FIG. 6D.

The speed control section 1200 can operate as a motor when the engine speed is higher than the vehicle speed, and the torque control section 1400 can operates as a generator when the vehicle load is larger than the engine torque, as described with regard to the first embodiment.

(Fourth Embodiment)

Figure 7:
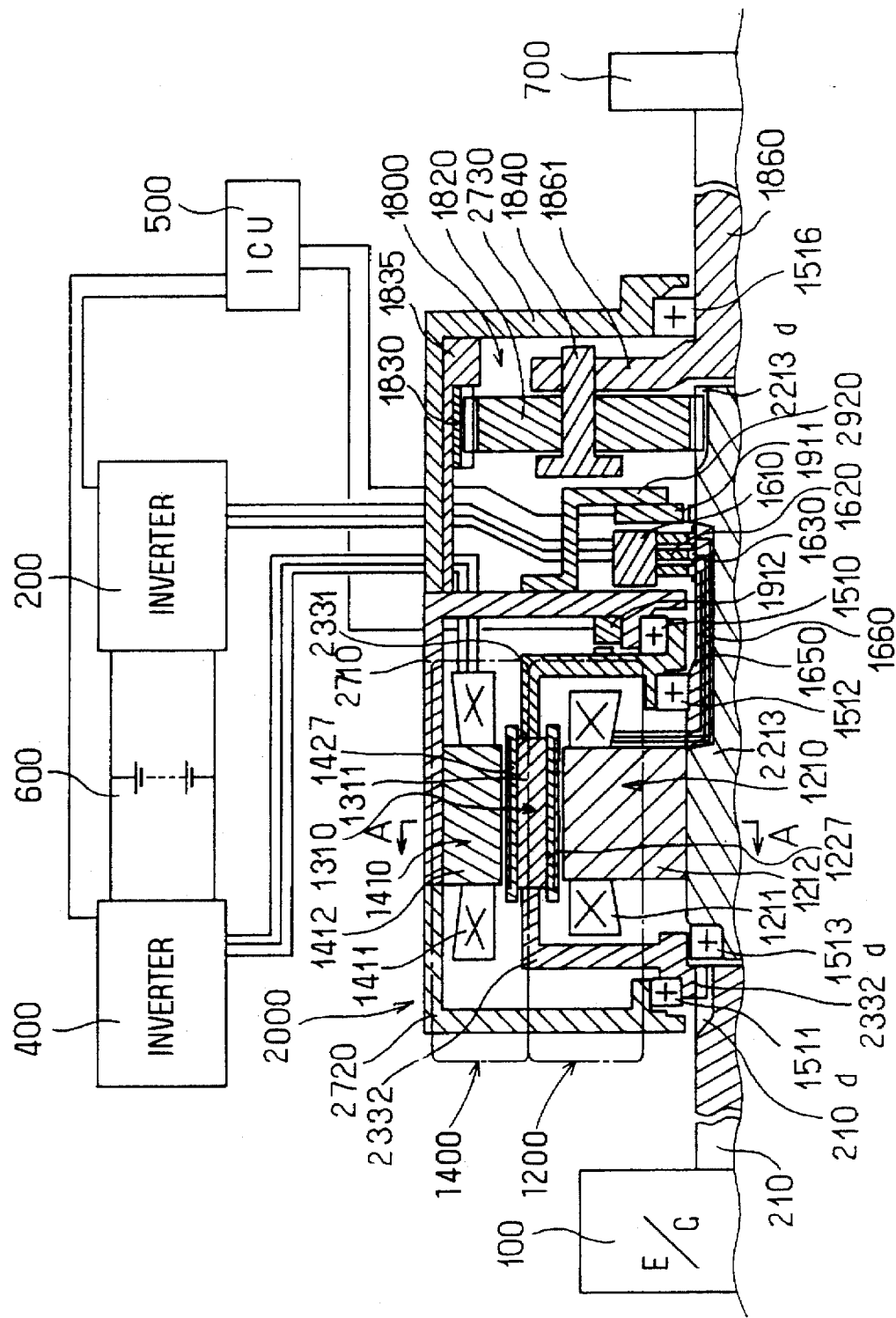
FIG. 7 is a schematic cross-sectional side view illustrating a system according to a fourth embodiment of the present invention.

A T-S converter according to a fourth embodiment is described with reference to FIG. 7.

Figure 5:
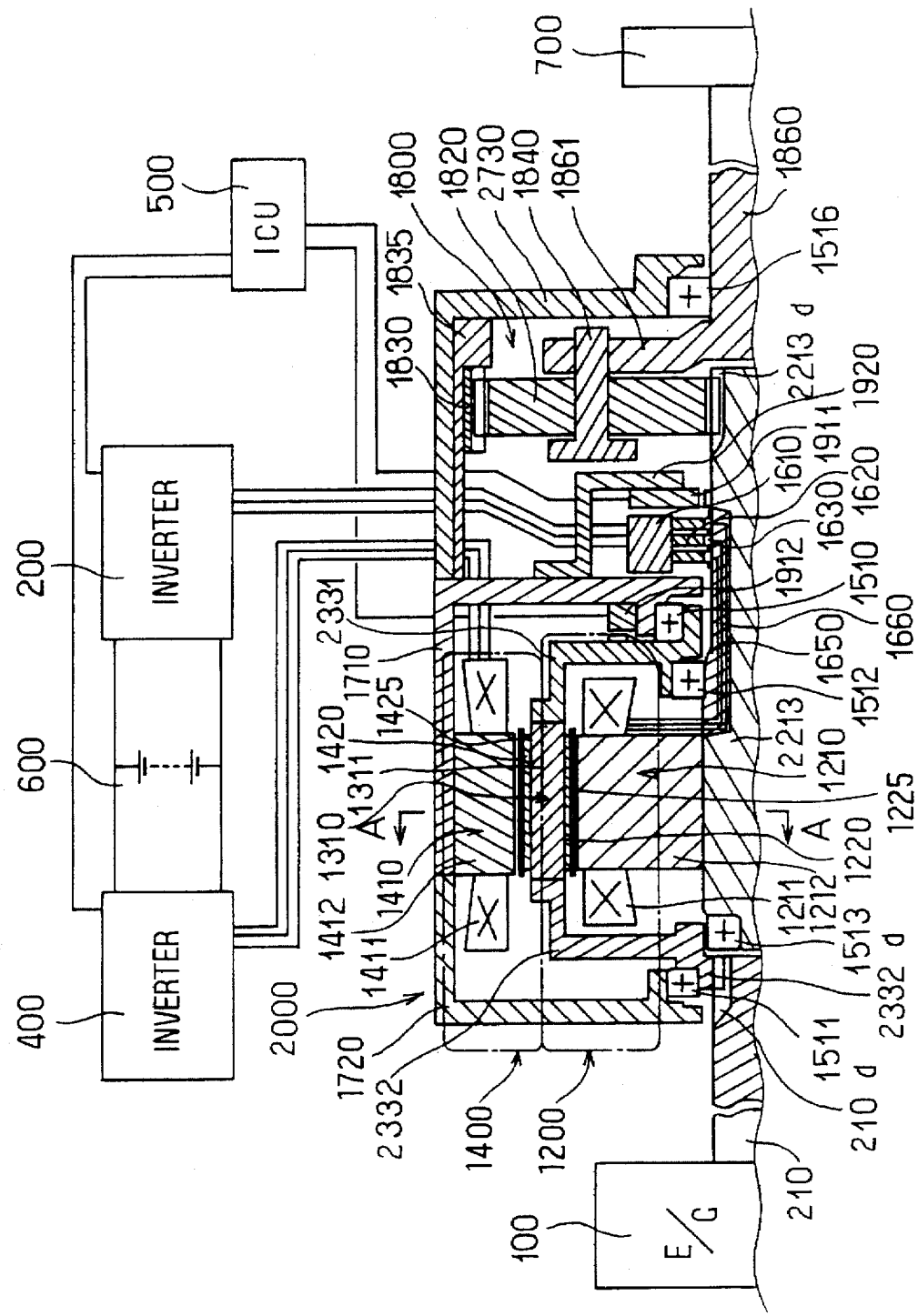
FIG. 5 is a schematic cross-sectional side view illustrating a system according to a third embodiment of the present invention.

The second rotor 1310 according to the fourth embodiment has squirrel-cage-conductors 1227 and 1427 instead of the permanent magnets of the T-S converter 2000 according to the third embodiment shown in FIG. 5. Accordingly, the second rotor 1310 operates as an induction motor instead of a synchronous motor in the first embodiment as described with regard to the second embodiment.

A cylindrical non-magnetic layer 1350 is disposed between the squirrel-cage-conductors in order to prevent magnetic interference between the speed control section 1200 and the torque control section 1400, as shown in FIG. 4 for the second embodiment.

(Fifth Embodiment)

Figure 11:
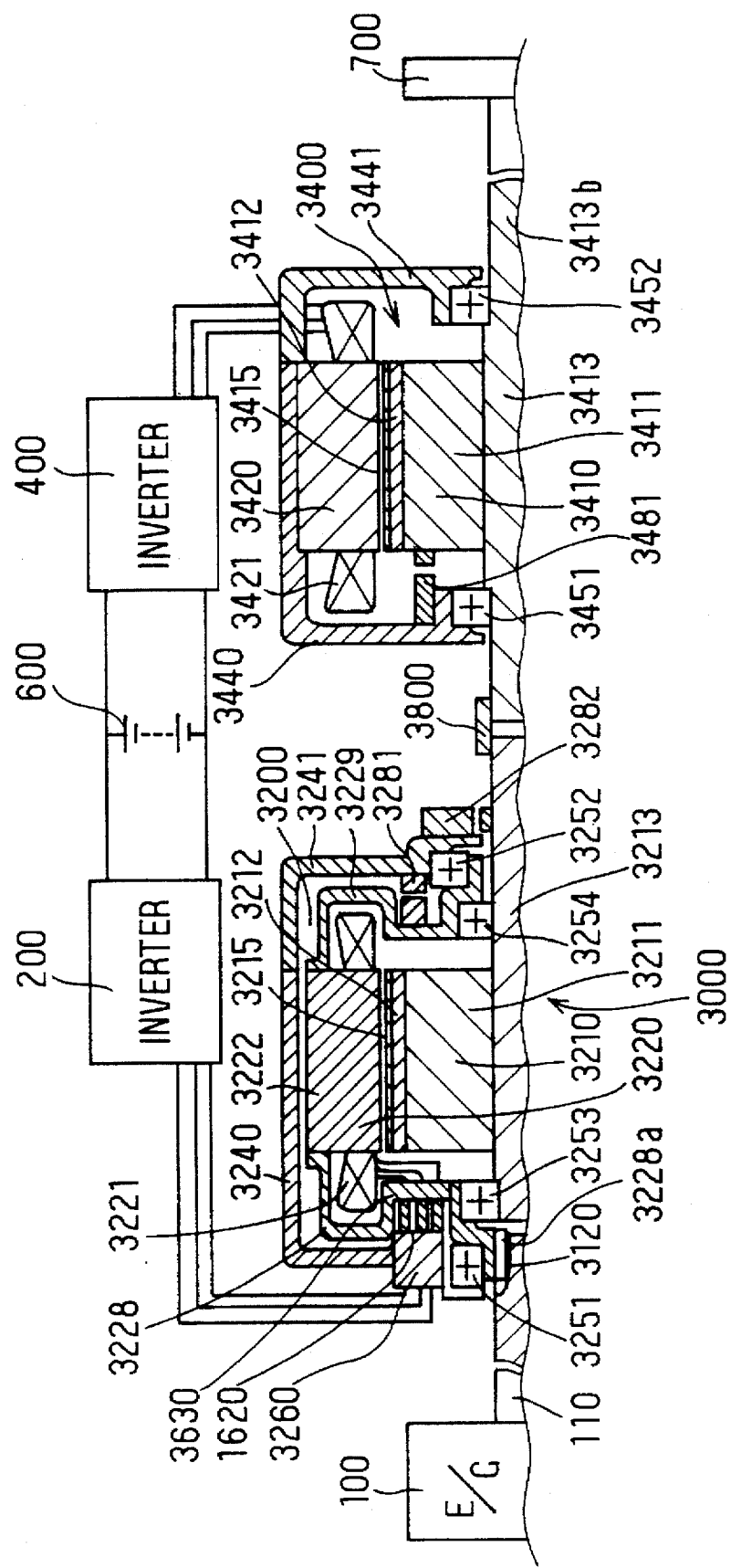
FIG. 11 is a schematic cross-sectional side view illustrating a system according to a fifth embodiment of the present invention.

A T-S converter 3000 according to a fifth embodiment of the present invention is described with reference to FIG. 11. The T-S converter 3000 is composed of a speed control section 3200 and a torque control section 3400 disposed tandem on an axis.

The speed control section 3200 is structured as a three-phase synchronous rotary electric machine and is composed of housings 3240 and 3241, a cylindrical second rotor 3220 supported by the housings 3240 and 3241 through bearings 3251 and 3252 and a first rotor.

The second rotor 3220 is connected to the output shaft 110 of the engine 100 and carries a shaft 3213 of a first rotor 3210 in line with the output shaft 110 of the engine 100 via bearings 3253 and 3254. The second rotor has a stator core 3222, a three-phase-winding coil (known as a coil of the three-phase rotary machine) 3221 and a pair of end frames 3228 and 3229.

The first rotor 3210 has a shaft 3213, a rotor core 3211 made of a soft iron which is fixed to the shaft 3213, magnetic poles having permanent magnets secured to the outer periphery of the core by a non-magnetic ring 3215 in structure well-known as a permanent magnet rotor of a generator.

An annular slip ring member 3630 is fixed to a radially inner portion of the end frame 3228. The slip ring member 3630 has three slip rings, which are connected to each phase winding of the coil 3221 and supported by an insulating member.

A brush member 3260 is connected to the inverter 200 and fitted to an opening which is formed on an end portion of the housing 3240. The brush member 3260 has a brush holder, three brushes 1620 slidably disposed in the brush holder and springs which bias the brushes against the slip rings. The inverter 200 supplies the coil 3221 with control current through the brush member 3260 and the slip ring member 3630.

A rotational speed sensor 3281 is disposed between an inner surface of the housing 3241 and an outer surface of the end frame 3229 to detect rotational speed of the second rotor 3220 and to send a signal to the inverter control unit 500 (which is described before). A rotational speed sensor 3282 is disposed between the outer surface of the housing 3241 and the shaft 3213 of the first rotor 3210 to detect rotational speed of the first rotor 3210 and send a signal to the inverter control unit 500.

The speed control section 3200 can be structured as an induction type rotary machine which provides squirrel cage conductors instead of the permanent-magnet poles.

The torque control section 3400 is a three-phase synchronous rotary machine. The torque control section 3400 has a third rotor 3410, housings 3440 and 3441 which support the third rotor 3410 via bearings 3451 and 3452, a stator core 3420 secured to the housing 3440 and a stator coil 3421 which is connected to the inverter 400. The third rotor 3410 has a shaft 3413 connected in line to the shaft 3213 of the first rotor 3210 by a coupling member 3800, a rotor core 3411 made of soft iron and a plurality of magnetic poles 3412 having permanent magnets supported by a non-magnetic ring 3415 in structure well-known as a permanent magnet rotor.

A rotational speed sensor 3481 is disposed between an inner surface of the housing 3440 and an end surface of the third rotor 3410 to detect rotational speed of the third rotor 3410.

When the engine 100 rotates, the second rotor 3220 is driven by the engine 100 and drives the first rotor 3210 and the third rotor which is connected thereto by electromagnetic force generated by the coil 3221 to rotate at a set rotational speed. The coil 3221 is controlled by the inverter 200 in a manner readily understood from the previous description. The inverter 400 supplies the stator coil 3421 with a control current so that the third rotor 3410 drives the vehicle wheels 700 with a set torque at the set speed in the same manner described before.

(Sixth Embodiment)

A T-S converter 4000 according to a sixth embodiment of the present invention is described with reference to FIG. 12.

The input shaft 1213 is connected to the engine output shaft 110 at the same side the speed reduction section 4800 is connected to the vehicle wheels 700 via a differential gear 900 in this embodiment. As a result, the T-S converter 4000 can be mounted in a limited space around the engine.

The speed reduction section 4800 is composed of a small gear 4810 and a large gear 4820 which is carried by a gear shaft 4840 and in mesh with the small gear 4810. The differential gear 900 is a common type which is composed of a large gear 830, a gear box 910 and differential gears 920 and 930 connected to the vehicle wheels 700.

The small gear 4810 of the speed reduction section 4800 is in mesh with the internal gear 1332a of the boss portion of the rotor frame 1332 which rotates as an output shaft of the T-S converter around the input shaft 1213, and the large gear 4820 of the speed reduction section 4800 is in mesh with the large gear 830 of the differential gear 900.

The rotation sensors 1911 and 1912 are disposed at a side remote from the output shaft of the engine and the output member (1332a) of the second rotor so that noise caused by torque transmission between the engine and the converter and between the converter and the vehicle wheels can be prevented from transmitting to the rotation sensors 1911 and 1912.

The brushes 1620 and slip rings 1630 are also disposed remote from the output shaft so that chattering of the brushes caused by the torque transmission can be prevented.

The speed reduction section 4800 can be composed of bevel gears instead of the spur gear.

(Seventh Embodiment)

Figure 13:
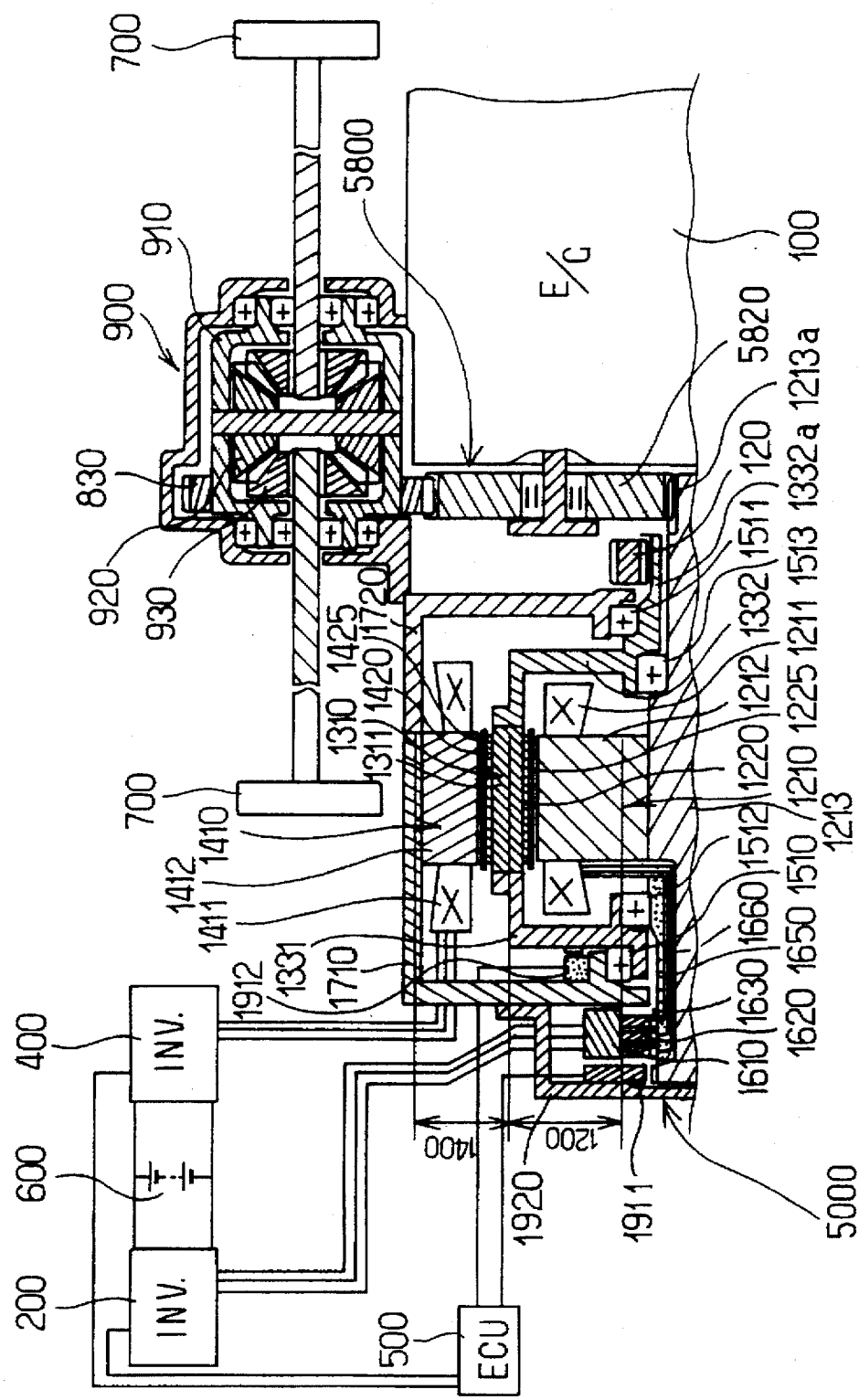
FIG. 13 is a schematic cross-sectional side view illustrating a system according to a seventh embodiment of the present invention.

A T-S converter 5000 according to a seventh embodiment of the present invention is described with reference to FIG. 13 and FIG. 14.

Figure 14:
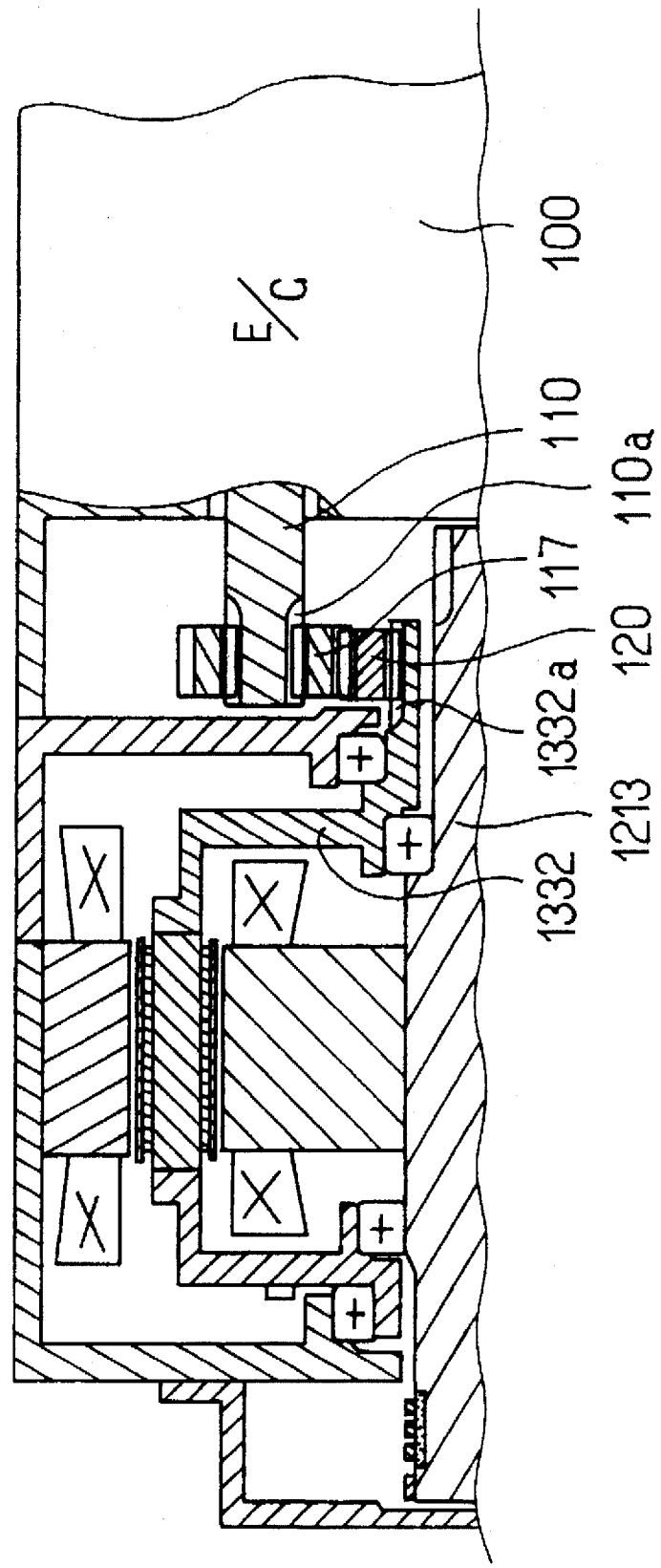
FIG. 14 is a schematic cross-sectional side view illustrating a portion of the system shown in FIG. 13.

A gear 117 is carried by the output shaft 110 of the engine 100 through serrations 110a, and is in mesh with a gear 120 which is connected to the frame 1332 of the second rotor 1310 through serrations 1332a so that the engine power is transmitted to the second rotor 1310 directly as shown in FIG. 14. The first rotor 1210 is carried by the shaft 1213 which is separated from the engine output shaft. A speed reduction section 5800 is composed of a large gear 5820 which is secured to a portion of the engine 100 and is in mesh with the large gear 830 of the differential gear 900 described before. A gear 1213a is formed at the end of the shaft 1213 on the side of the engine 100 and is in mesh with the large gear 5820.

Driving power is transmitted from the first rotor 1210 through the gear 1213a, the large gear 5820 and the differential gear 900 to the vehicle wheels 700.

(Variations of the Second Rotors)

Structural variations of the second rotor 1310 are described briefly with reference to FIGS. 13A through 13H.

Figure 15A:
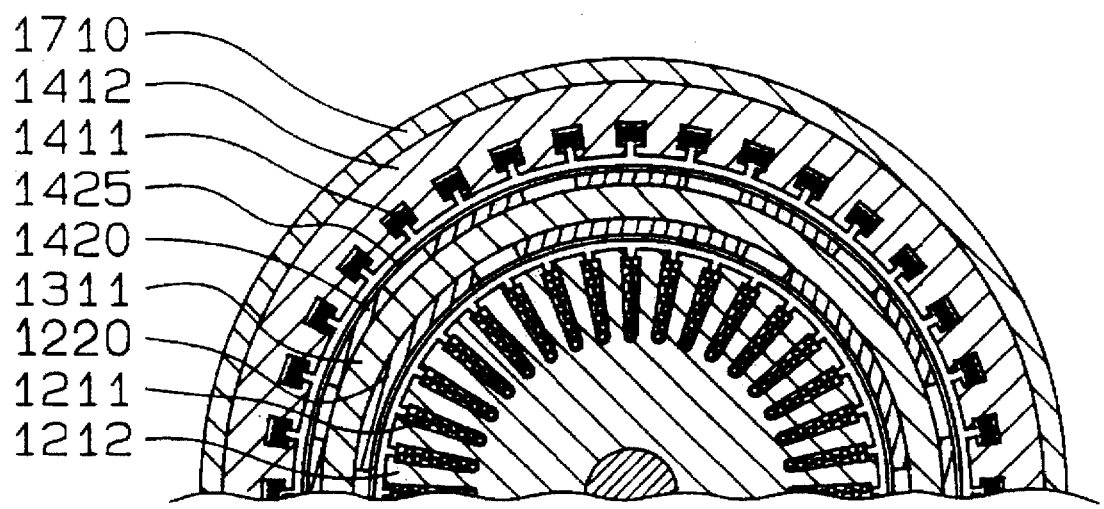
FIGS. 15A, 15B, 15C, 15D, 15E and 15F are cross-sectional views illustrating variations of a second rotor of the T-S converter according to the present invention.

The number of the internal magnets 1220 of the second rotor 1310 is different from the number of the external magnets 1420, and the internal magnet is wider than the external magnet 1420 as shown in FIG. 15A.

Figure 15B:
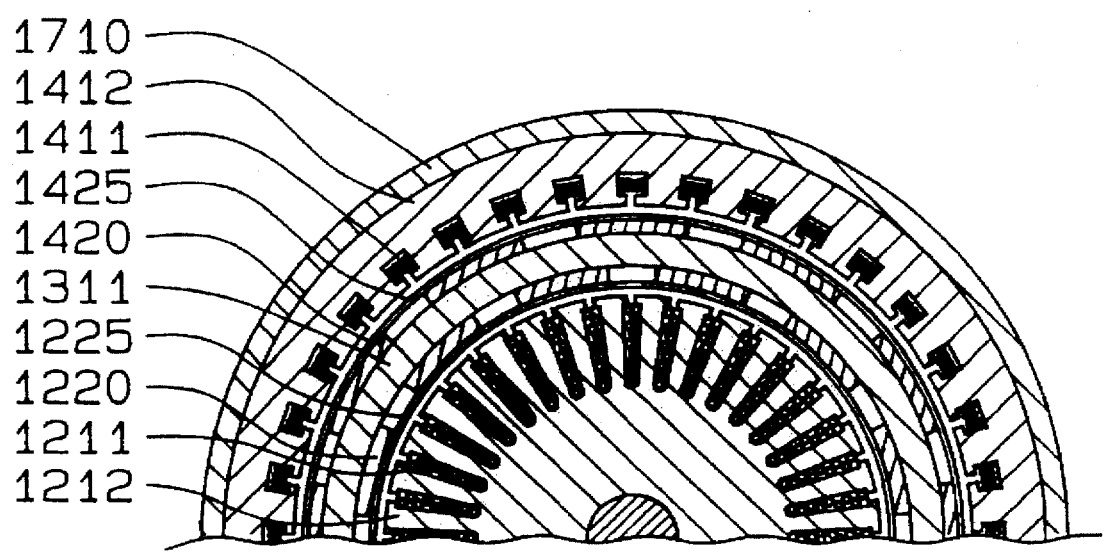

The angular position of the internal magnets 1220 is different from that of the external magnets 1420 as shown in FIG. 15B.

Figure 15C:
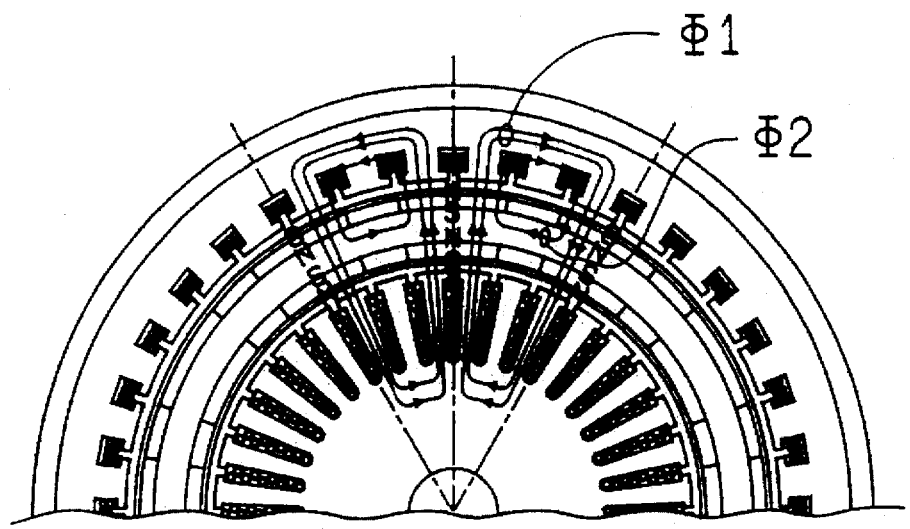

The number and the angular position of both internal and external magnets are the same as shown in FIG. 3 and FIG. 15C, however, the magnetic polarity on the same angular position is specific. That is, if one of the internal magnets 1220 facing the first rotor 1210 is polarized S, a corresponding one of the external magnets 1420 facing the stator 1410 is polarized N and the adjacent one of the internal magnets 1220 is polarized N and also the adjacent one of the external magnets 1420 corresponding to the last is polarized S so that the composite magnetic flux 1 generated by both internal and external magnets interlinks both coils 1211 and 1411 as shown in FIG. 15C. As a result, differential magnetic flux 2 passing between both coils 1211 and 1411 is reduced and radial thickness of the rotary yoke 1311 can be reduced.

Figure 15D:
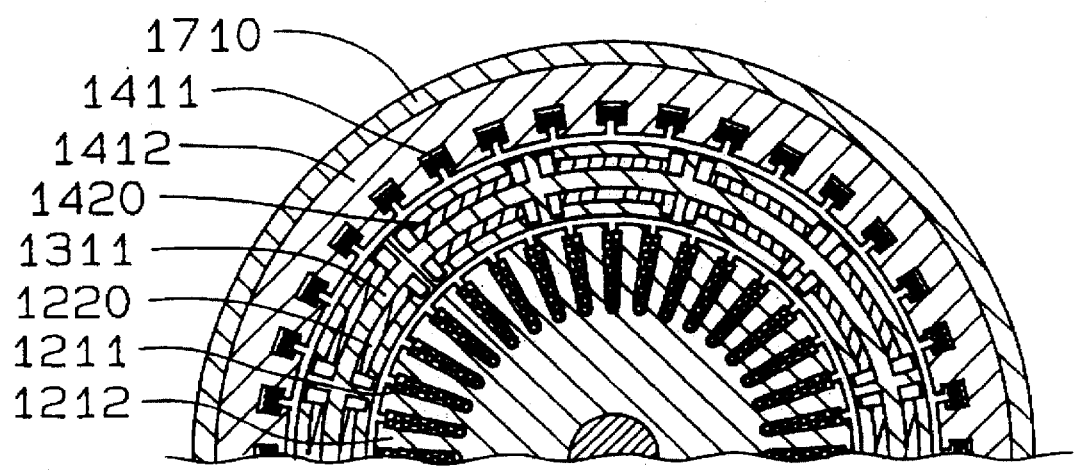

The above effect can be attained also by a structure shown in FIG. 15D. The internal and external magnets 1220 and 1420 are disposed in cavities hollowed out of the rotary yoke 1311 which is made of laminated thin steel-plates so that the non-magnetic ring 1425 can be omitted. Since the outer periphery of the rotary yoke can be lathed, the gaps between the first and second rotors 1210 and 1310 and between the second rotor 1310 and the stator core 1412 can be reduced, thereby reducing the size of the T-S converter.

Figure 15E:
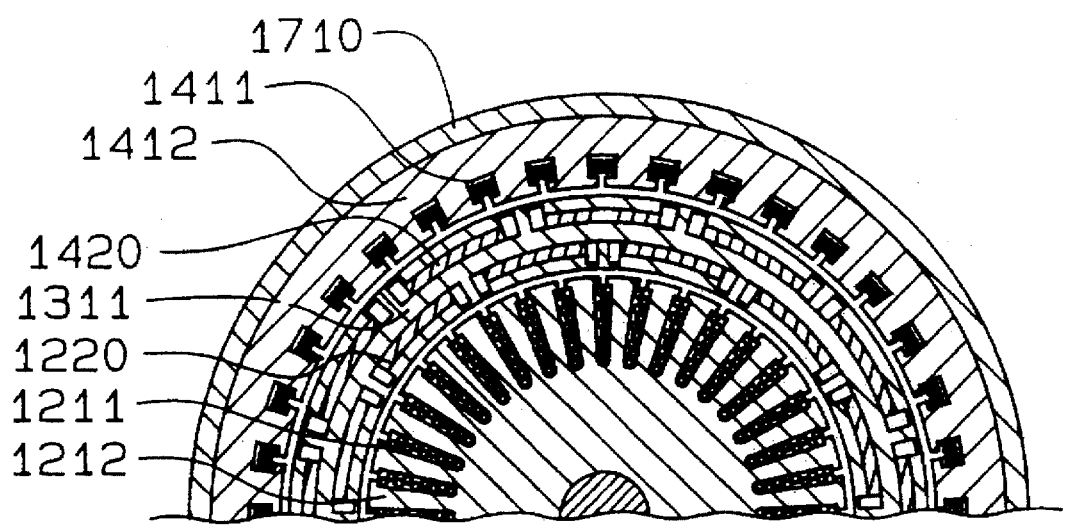

The angular position of the external magnets 1420 is shifted from the angular position of the internal magnets 1220 in the second rotor 1310 as shown in FIG. 15E.

Figure 15F:
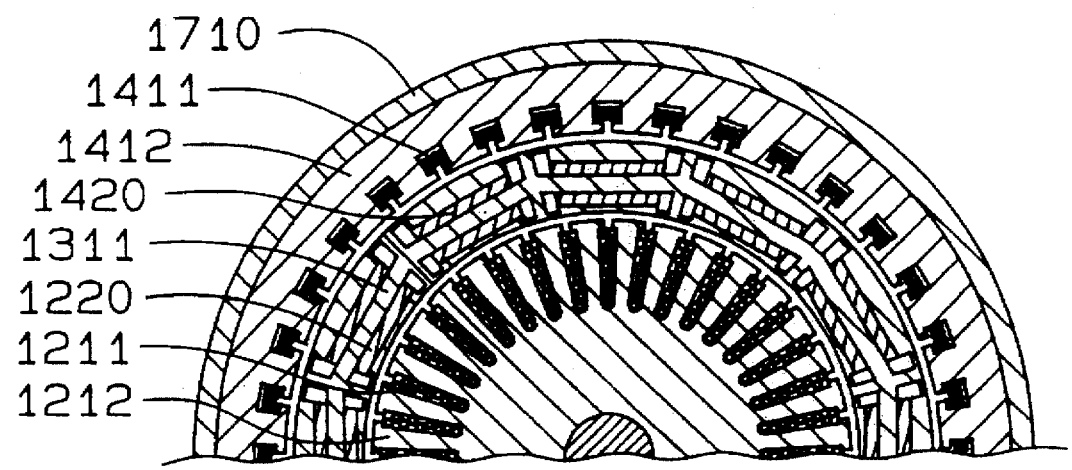

Flat magnets are used for the internal and external magnets 1220 and 1420 in the second rotor 1310 as shown in FIG. 15F.

(Eighth Embodiment)

An eighth embodiment is described with reference to FIG. 16 and FIGS. 17A, 17B and 17C.

The T-S converter has the speed control section, the torque control section and the speed reduction section as in the previous embodiments. The inverters 200 and 400, ECU 500, battery 600, vehicle wheels or driven wheels 700, reduction section 4800, differential gear 900 are substantially the same as those described before (e.g. sixth embodiment shown in FIG. 12).

The T-S converter has the first rotor 1210, second rotor 1310 and a trans-stator 2810 which corresponds to a second stator. The trans-stator 2810 is composed of three phase windings 2811 and a trans-core 2812. The first rotor 1210 carries a trans-rotor 2260 which corresponds to a third rotor and provides the mutual electromagnetic induction force with the trans-stator 2810. The first rotor 1210 has the three-phase control coils 1211 and the rotor core 1212. The trans-rotor 2260 is composed of coils 2261 which provide magnetic induction field corresponding to each phase of the first rotor 1210 and a trans-core 2262. Three pairs of the coils 2261 and the core 2262 are parallelly disposed along the shaft 1213, the rotation sensor 1911 is fixed to an inside of the outer frame to face the core 2262 as shown in FIG. 16.

Figure 17A:
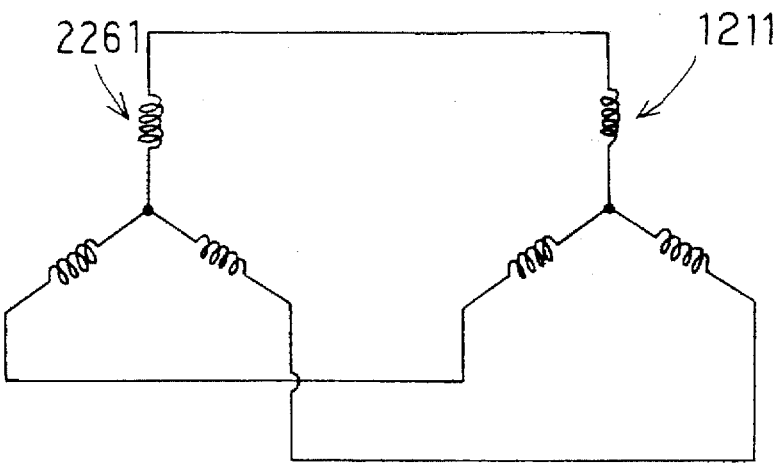
FIGS. 17A, 17B and 17C are circuit diagrams illustrating variations of connection of coils of a first rotor and a trans-rotor.
Figure 17B:
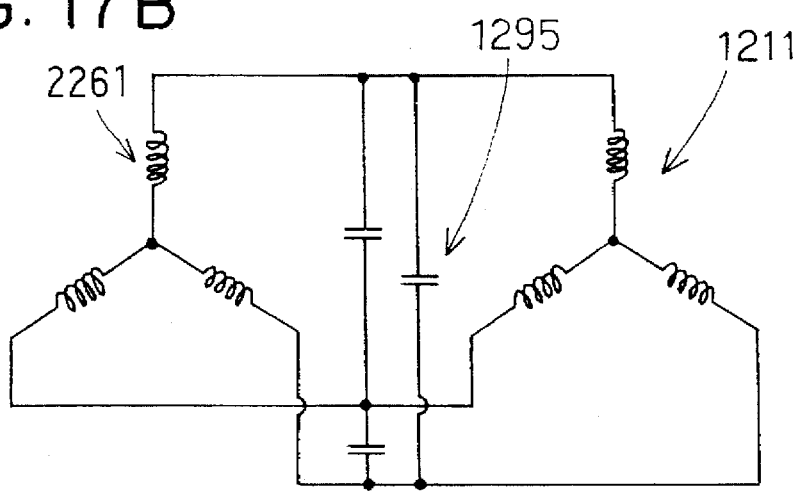
Figure 17C:
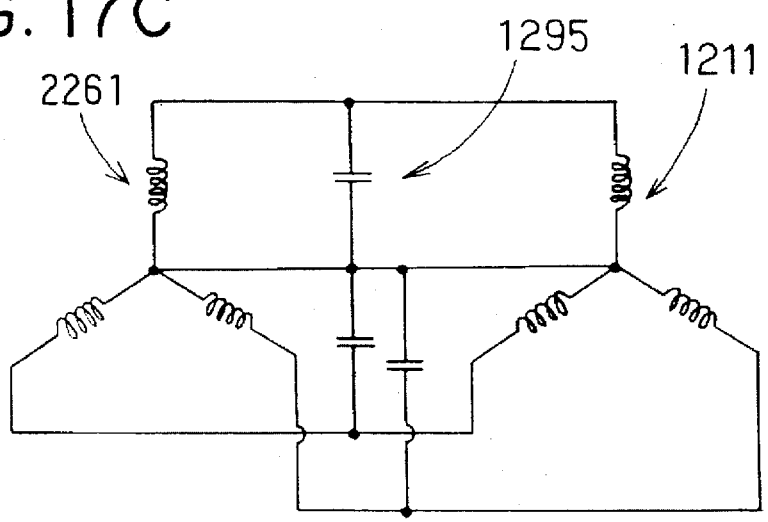

The coils 2261 of the trans-rotor 2260 are respectively connected to the three-phase coils 1211 of the first rotor 1210 as shown in FIG. 17A, FIG. 17B or FIG. 17C which are variations of the connection. The trans-stator 2810 is fixed to a portion of the outer frame 1710 to face the core 2260 at a certain air gap. The core 2810 has coils 2811 which are respectively connected to the inverter 200. Thus the trans-stator 2810 and the trans-rotor 2260 compose a trans stator 2800 and supplies electric power from the inverter 200 to the three-phase coils 1211 of the first rotor 1210.

Figure 12:
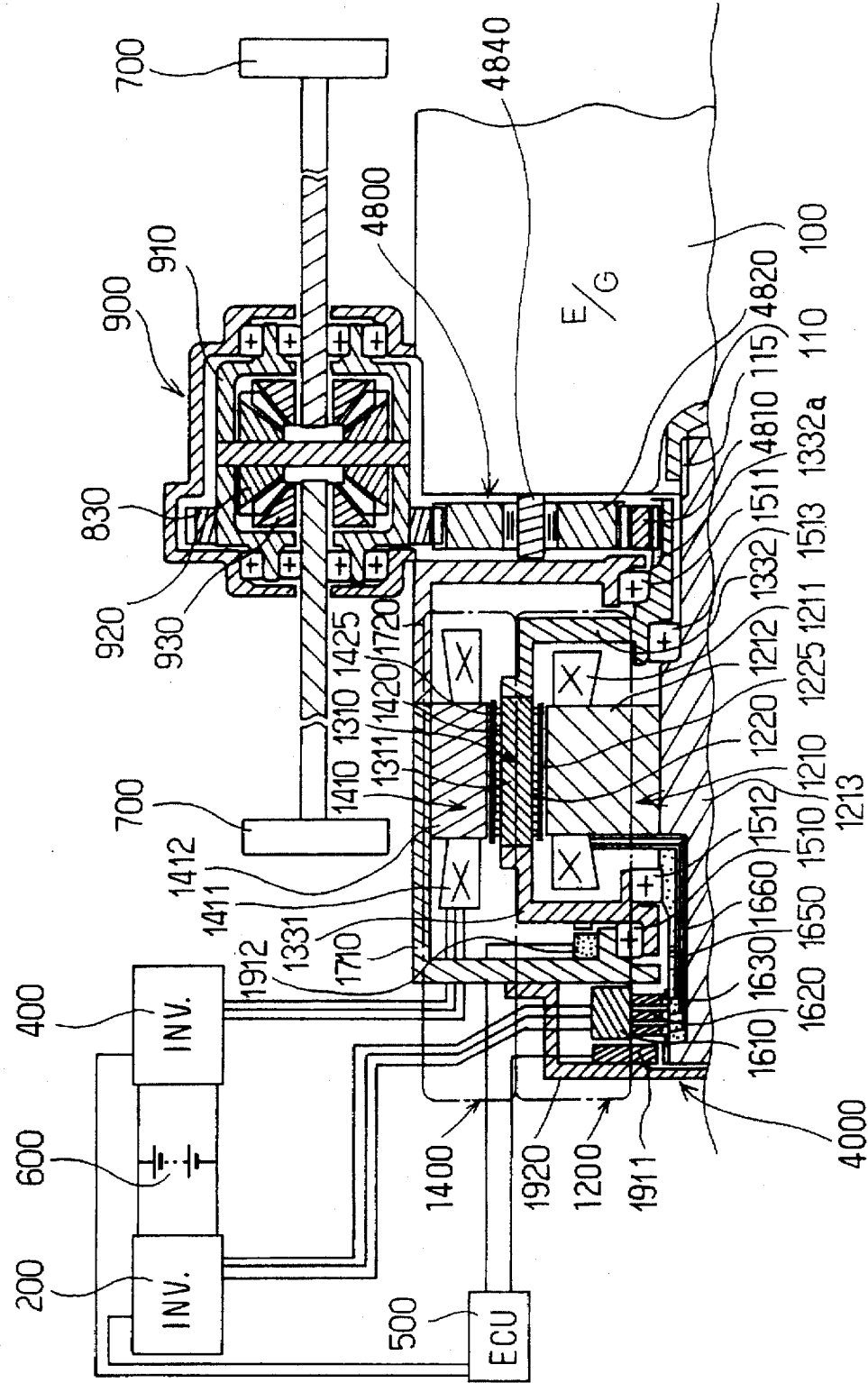
FIG. 12 is a schematic cross-sectional side view illustrating a system according to a sixth embodiment of the present invention.

The second rotor is substantially the same in the structure and function as that shown in FIG. 12, except for the rotor frame 1331. The rotor frame 1332 of this embodiment has a longitudinally extending cylindrical portion 1332b, a vertical disk portion 1332c and a hollow shaft 1332d (which are the same as the sixth embodiment shown in FIG. 12).

Since the electric power can be transferred means of the electromagnetic induction without contact member, the system maintenance becomes easier and the reliability is improved.

(Ninth Embodiment)

Figure 18:
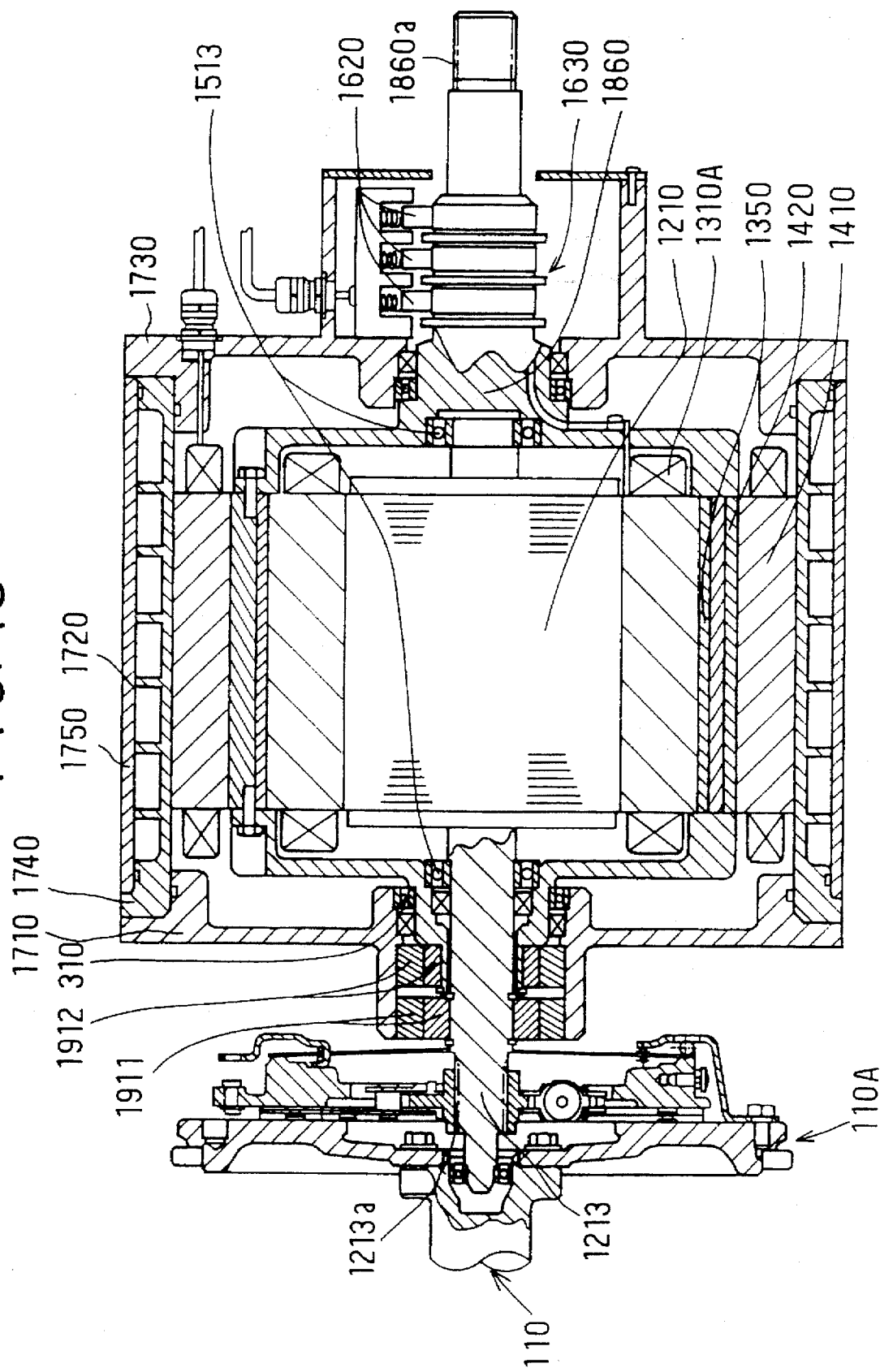
FIG. 18 is a cross-sectional side view illustrating a main part of a system according to a ninth embodiment of the present invention.
Figure 19:
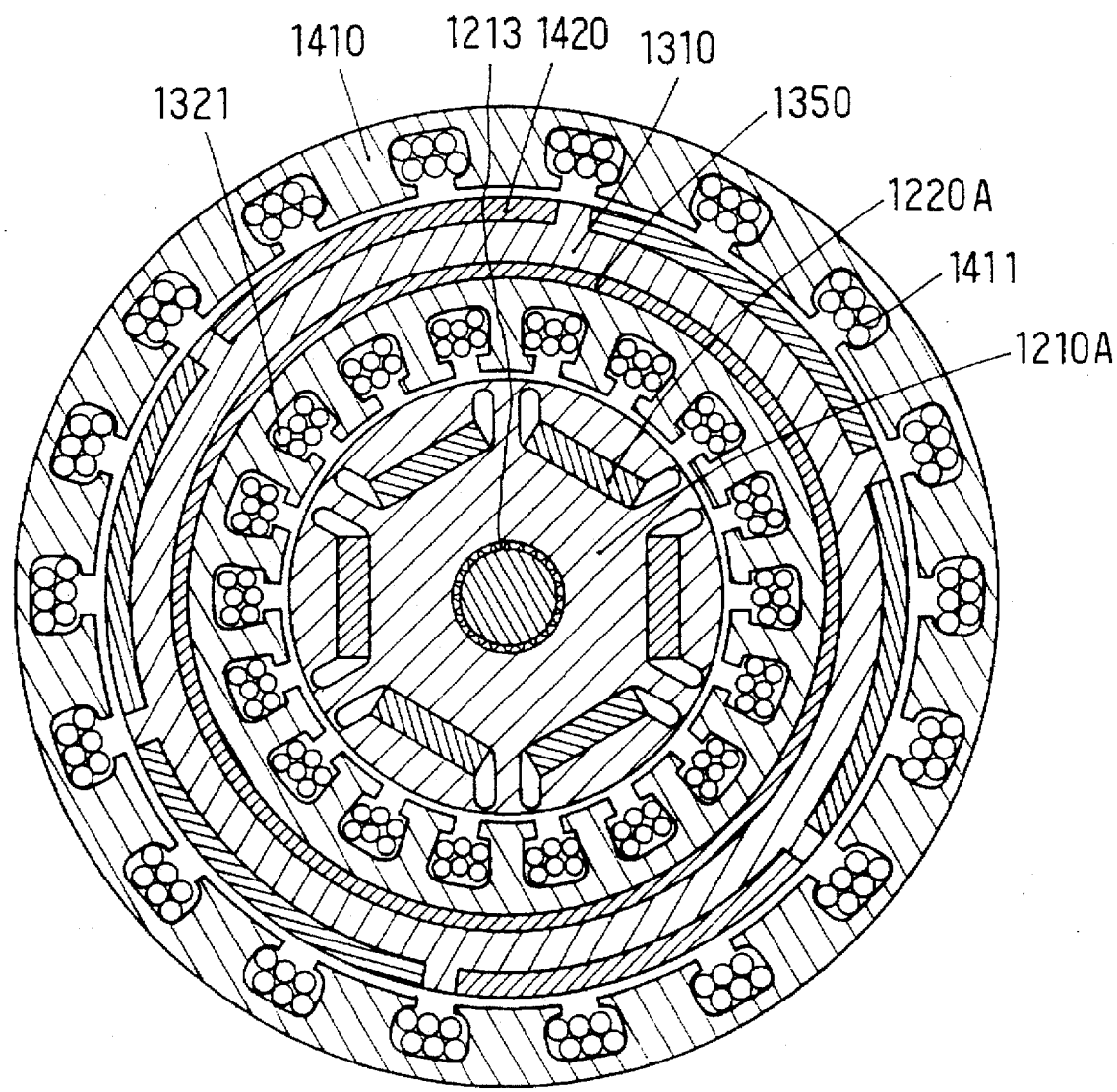
FIG. 19 is a cross-sectional plan view illustrating a main part of a system according to a ninth embodiment of the present invention.

A T-S converter according to ninth embodiment is described with reference to FIG. 18 and FIG. 19.

The T-S converter has outer frames 1710, 1720, 1730, 1740 and 1750. The outer frames 1740 and 1750 provide cooling passages of the rotary machine section. The input shaft 1213 and output shaft 1860 have splines at the ends respectively and connected between the engine 100 and the vehicle wheels 700 as described before. The T-S converter has a first rotor 1210 which is secured to the input shaft 1213 by serrations and equipped with permanent magnets 1220A and a second rotor which is rotatably carried by the input shaft 1213 and equipped with control coils 1321.

Electric power is supplied to the control coils 1321 through the slip rings 1630 fixed to the output shaft 1860 and brushes 1620 fixed to the outer frame 1730 as described before. The six permanent magnets 1220A of the first rotor 1210 are made of neodium-iron compound and fixed on respective sides of an incribed hexagon by adhesive. Thus, the second rotor 1310A corresponds to a stator with respect to the first rotor 1210A and a rotor with respect to the stator 1410. The rotation sensor 1911 detects the rotational speed of the first rotor 1210A and the rotation sensor 1912 detects the rotational speed of the second rotor 1310A in the same manner described before. The non-magnetic ring or layer 1350 prevents interference of the magnetic fields generated by the permanent magnets 1420 and the control coils 1321 as described before (see FIG. 4), thereby shortening the radial distance between the permanent magnets 1420 and control coils 1321. Other parts are substantially the same as the above-described embodiments.

(Tenth Embodiment)

A T-S converter according to a tenth embodiment is described with reference to FIG. 20. The input shaft 1213 has a plurality of different diameters in the longitudinal direction to be supported by the bearings 1511, 1512 and 1514 and carry the first rotor 1210, slip rings 1630.

The diameter of the input shaft 1213 becomes smaller toward the engine 100 and the shaft end having the smallest diameter is supported by the bearing 1514 whose outer race is fitted to the outer frame 1730.

The output shaft 1860 is formed integrally with the cup-shaped rotor frame 1332 which is supported by the outer frame 1720 through the bearing 1513 in this embodiment. The other end of the input shaft 1213 is supported by the bearing 1511 whose outer race is fitted to an axially extending boss portion of the rotor frame 1332. The boss is formed in a space radially inside the coil ends of the control coils 1211, so that the axial length of the second rotor 1310 can be made short.

An axial end of the rotary yoke 1311 is located at the same position as those of the first rotor 1210 and the rotor core 1212 and is supported by the cup-shaped rotor frame 1332. Another rotor frame 1331 has cylindrical portions of different diameter which reduces toward the engine, the portion having a minimum diameter extends around the input shaft with a small gap and has the bearing 1510 on the outer periphery thereof.

The outer race of the bearing 1520 is fitted to a plate member 1710a extending from the outer frame 1710.

A rotation sensor or resolver 1912 is disposed between the rotary frame 1331 and the plate member 1710a. The resolver 1912 is composed of a resolver rotor 1912a secured to the rotary frame and a resolver body 1912b secured to the plate member 1710a, and detects the rotation speed of the second rotor 1310 relative to the outer frame 1710. The output signal of the resolver 1912 is applied to the ECU 500 to control the rotation of the second rotor 1310.

The rotary frame 1331 is supported by the input shaft through the bearing 1512 at a place closer to the first rotor 1210 than to the bearing 1510.

The lead wire of the stator 1410 extends through the plate member 1710a and a plug 1711 fixed to the outer frame 1710 to the outside to be connected to the inverter 400.

A rotation speed sensor or resolver 1911 is disposed around the input shaft 1213 between the slip rings and the bearing 1514. The resolver 1911 is composed of a resolver rotor 1911a carried by the input shaft 1213 and a resolver body 1911b secured to the plate member 1710a to detect the rotation speed of the first rotor 1210. The output signal of the resolver 1911 is sent to the ECU 500 to control the rotation speed of the first rotor 1210.

The current control of the speed control section 1200 is described with reference to FIGS. 21A and 21B.

Figure 21A:
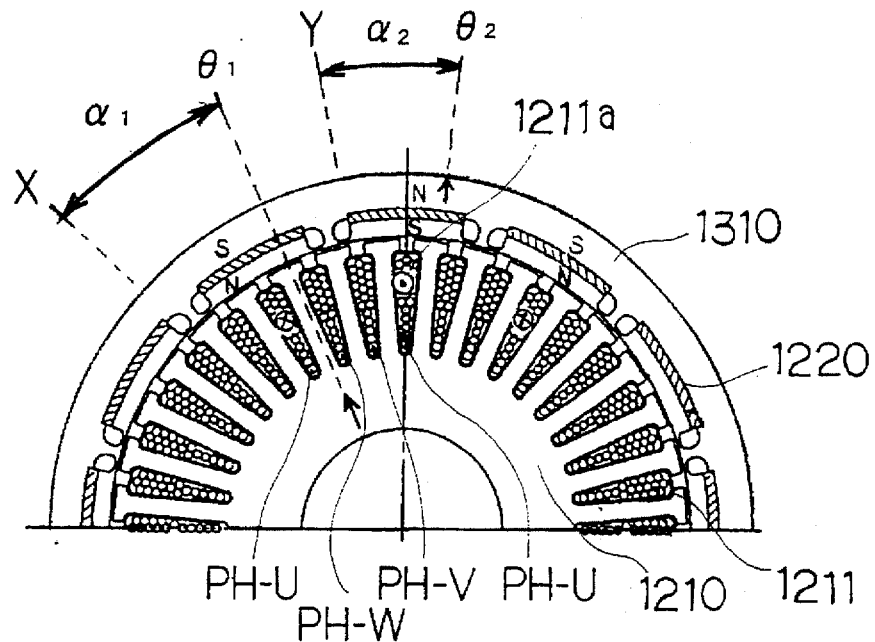
FIGS. 21A and 21B and FIG. 22 are cross-sectional plan views illustrating a main portion of a T-S converter of the system according to the tenth embodiment.
Figure 21B:
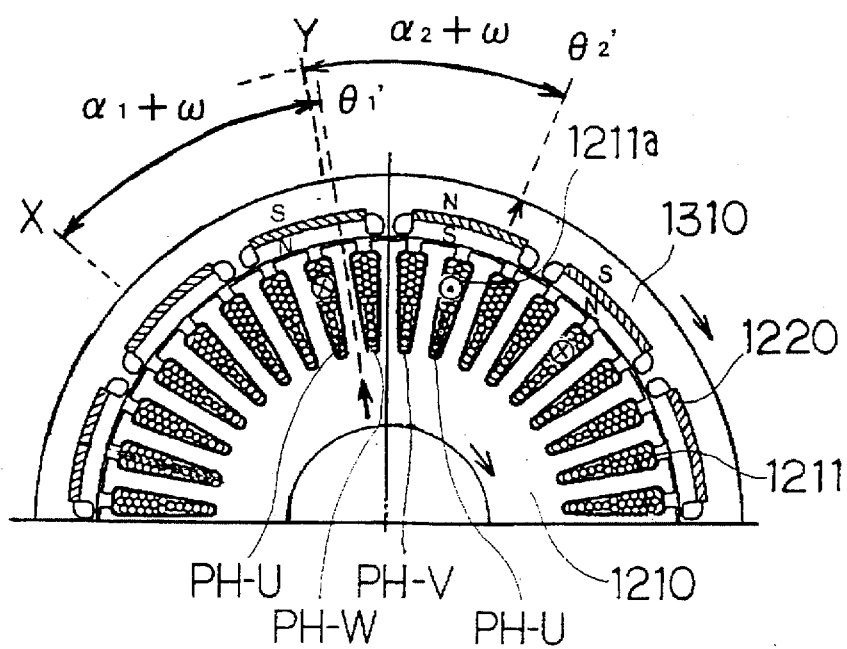

In FIG. 21A, when U-phase coil 1211a whose current Iu flows from the other side of the sheet of the drawing to this side and the center of the N-pole of the permanent magnet 1220 of the second rotor 1310 are aligned with each other, detected angles $\theta_1$ and $\theta_2$ of both resolvers 1911 and 1912 become as follows:

$$E1: \theta_1 = \alpha_1 + (360/P)^\times m$$

where $0 \leq \alpha_1 < 360/P$, $m = 0, 1, \ldots, \ldots, P-1$ $$E2: \theta_2 = \alpha_2 + (360/P)^\times n$$

where $0 \leq \alpha_2 < 360/P$, $n = 01, \ldots, \ldots, P-1$

In the above equations, P is the number of pole pairs and (360/P) corresponds to the mechanical angle of each pole pair, and $(360/P)^\times m$ and $(360/P)^\times n$ correspond to the angular position of the resolver 1911 and 1912 respectively indicated by X and Y. $\alpha_1$ and $\alpha_2$ are displacement angle for each pole pair of the first and the second rotors 1210 and 1310.

The displacement angles $\alpha_1$ and $\alpha_2$ and the detected angles $\theta_1$ and $\theta_2$ change with rotation of the first and second rotors. However, if the first and second rotors 1210 and 1310 rotate by the same angular displacement $\omega$, the difference of the detected angle between both revolvers 1911 and 1912 becomes constant as indicated by the following equation E3.

$$E3: \theta_2' - \theta_1' = \{\alpha_2 + \omega + 360/P)^\times n\} - \{\alpha_1 + \omega + 360/P)^\times m\} = (\alpha_2 - \alpha_1) + (360/P)^\times k = \theta_2 - \theta_1$$

where $k = 0, 1, \ldots, \ldots, P-1$

Therefore, if the second rotor rotates at the same speed as the first rotor 1210, the current phase angle $(\theta_2 - \theta_1)$ becomes constant and the current Iu to be supplied to the U-phase coil 1211a of the first rotor 1210 is given by an equation E4.

$$E4: Iu = Io \cos P\{(\theta_2 - \theta_1) - (\alpha_2 - \alpha_1)\}$$

Thus, the relative rotational angle can be obtained without detecting directly by the resolver so that the current supplied to the control coil 1211 of the first rotor 1210 can be controlled.

The above can be also applied to a case in which an angular speed $\omega_2$ of the second rotor 1310 is smaller than an angular speed $\omega_1$ of the first rotor 1210 (e.g. $\omega_2 = \omega_1/2$), which is explained below.

Figure 22:
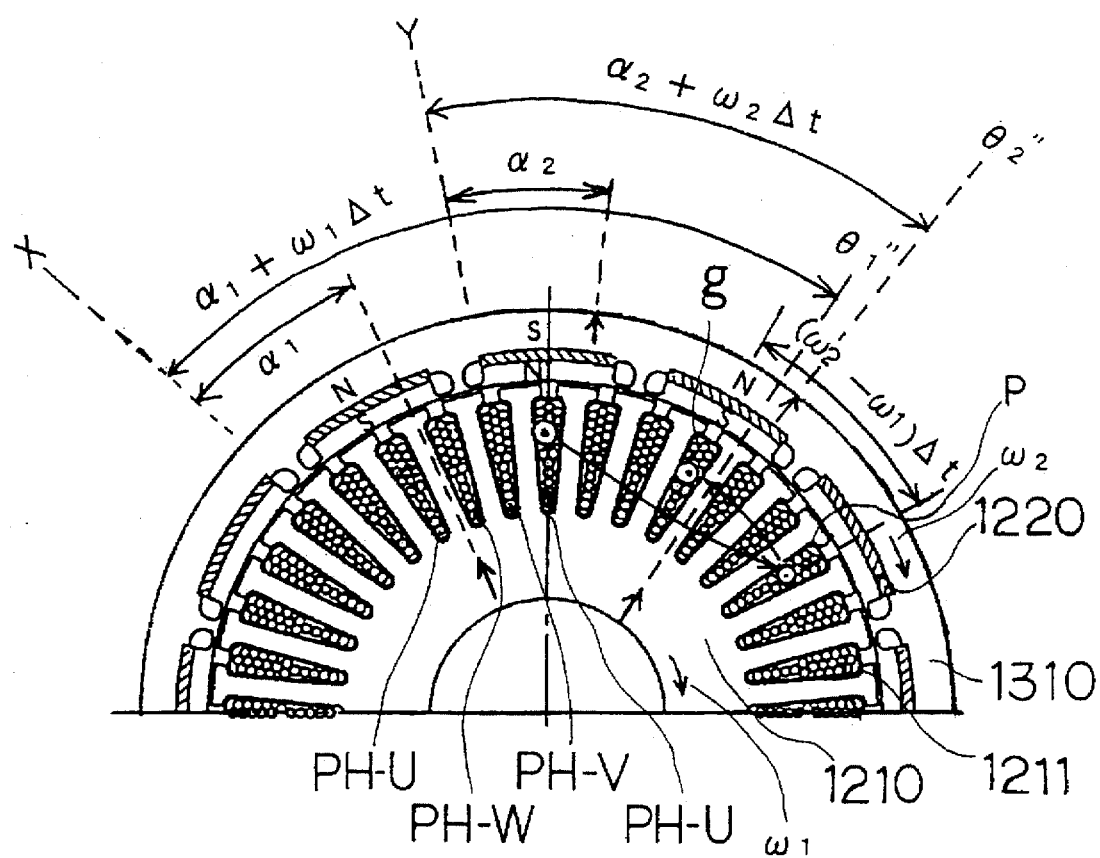

The positions of the first and second rotors 1210 and 1310 when time $\Delta T$ has passed are shown in FIG. 22. It is noted that the relative angular distance between both rotors 1210 and 1310 changes so that when the same coil (position P) is supplied with current, the relationship between the current and the magnetic field changes to the opposite and the driving force does not act in the same direction as that in FIG. 21A.

In order for the second rotor 1310 to have the same driving force, the current I must flow in the coil at position g shown in FIG. 22 and, therefore, the position of the current supply must be changed by an angle $(\omega_1 - \omega_2) \Delta T$.

In this case, as the second rotor 1310 which is on the input side rotates at a speed lower than the first rotor 1210 which is on the output side, the T-S converter is in the generating mode. In order to make the driving torque between the first and second rotors 1210 and 1310 constant, the current supply phase angle has to be controlled.

The current supply phase angle $(\theta_2''' \theta_1'')$ is given as follows.

$$E5: \theta_2'' - \theta_1'' = \{\alpha_2 + \omega_2 \Delta t + (360/P) \times n\} - \{\alpha_1 + \omega_1 \Delta t + (360/P) \times m\}$$
$$= (\alpha_2 - \alpha_1) - (\omega_2 - \omega_1)\Delta t + (360/P) \times k$$

The current supply position of the E5 is different from that of E3 by $(\omega_2 - \omega_1) \Delta t$.

The resolver may be replaced by some other sensor such as magnetic or optical encoder.

(Eleventh Embodiment)

Figure 23:
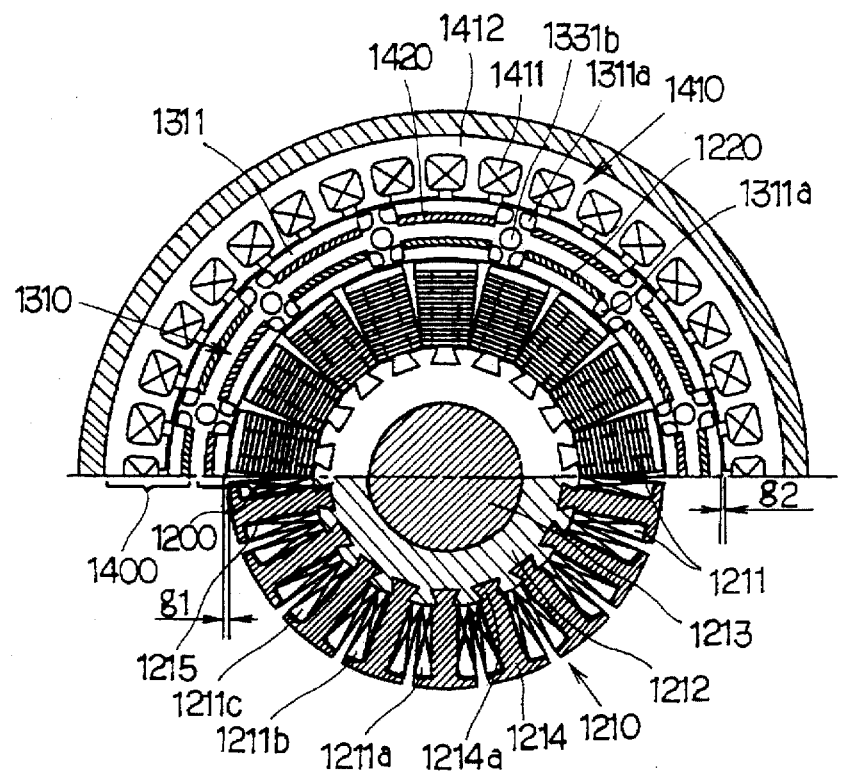
FIG. 23 is a cross-sectional plan view illustrating a main portion of a T-S converter of the system according to an eleventh embodiment of the present invention.
Figure 24:
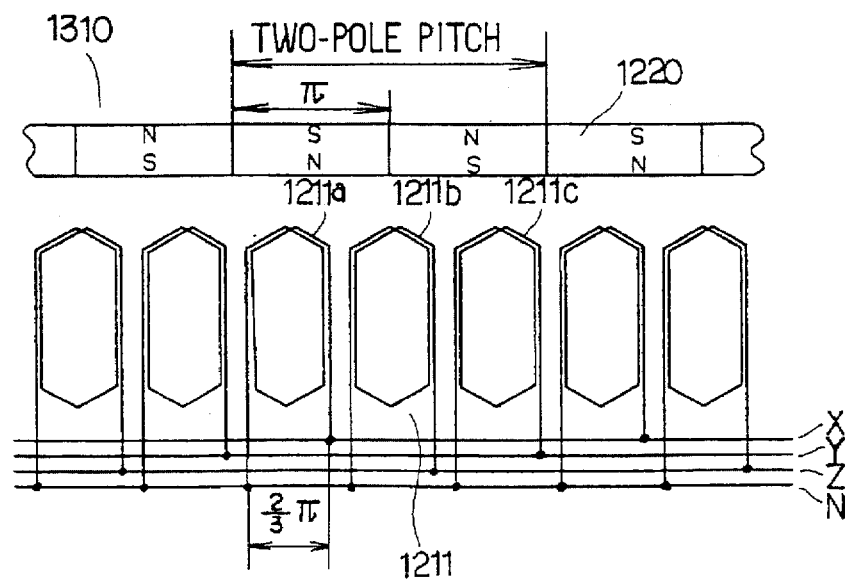
FIG. 24 is a schematic view showing relationship between the coil pitch and the pole pitch of a first rotor of the T-S converter of the system according to the eleventh embodiment.
Figure 25:
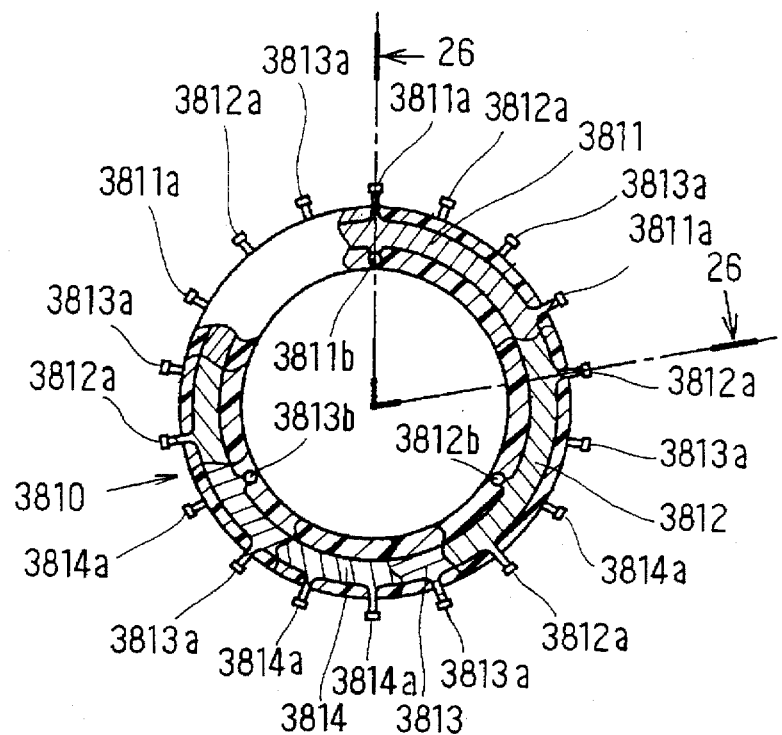
FIG. 25 is a fragmentary plan view illustrating a terminal of the system according to the eleventh embodiment.
Figure 26:
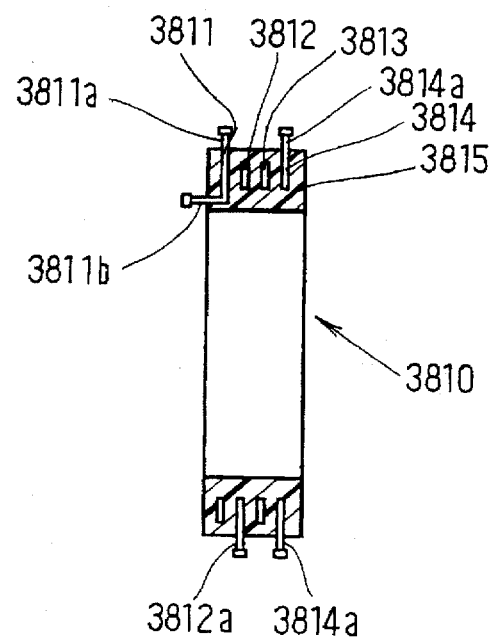
FIG. 26 is a cross sectional side view illustrating a portion of the terminal cut along lines 26 in FIG. 25.
Figure 27:
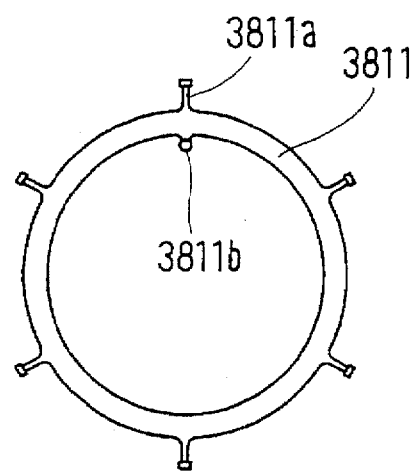
FIG. 27 is a plan view illustrating a conductive member used in the system according to the eleventh embodiment.
Figure 28:
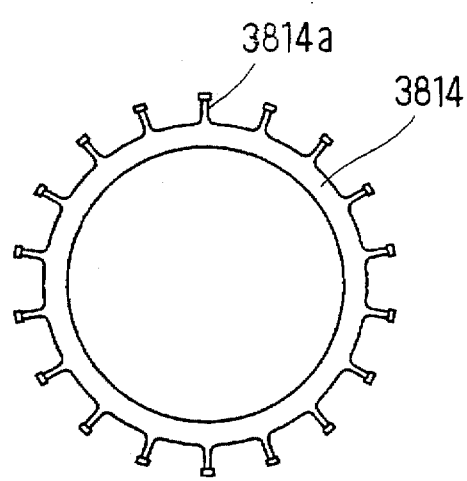
FIG. 28 is a plan view illustrating a conductive member used in the system according to the eleventh embodiment.

A T-S converter according to an eleventh embodiment is described with reference to FIGS. 23, 24 and 25. What is different from the tenth embodiment is the three-phase control coil 1211, which is described in detail.

A disk shaped rotor core 1212 has a plurality of T-shaped salient teeth 1214 disposed therearound circumferentially at an equal interval. Each one of the teeth 1214 has a dovetail at one end, which is fitted in a groove formed in the rotor core.

Each one of the phase coils 1211a, 1211b and 1211c is wound around one of the salient teeth 1214 in that order in the concentrated winding style via an insulating sheet 1215.

Accordingly, the space factor of the phase coils is improved and magnet wire having larger diameter can be wound to decrease the wire resistance. Moreover, since the wire can be wound more tightly, a stronger machine structure to the centrifugal force can be provided.

Three teeth 1214 are disposed in an arc between a pair of magnet poles of the second rotor 1310. Each of the phase coils 1211a, 1211b and 1211c is connected to a ring-shaped terminal 3810 (shown in FIG. 25) to be connected to each couple of terminal lines X, Y and Z as shown in FIG. 24.

The terminal 3810 has three ring-shaped terminal members 3811, 3812 and 3813 each of which is connected to a coil end of one of the phase coils 1211a, 1211b and 1211c, a single terminal member 3814 which is connected to the other coil end of each of the phase coils 1211a, 1211b and 1211c and an insulator 3815 which insulates and supports the terminal members 3811-3814. The three terminal members 3811-3813 have the same shape.

The terminal member 3811 has projections 3811a which the coil ends of the phase coils 1211a, 1211b and 1211c are wound around to be soldered thereto and projections 3811b to which the lead wire 1660 shown in FIG. 20 is connected. The terminal member 1812 has projections 3812a and 3812b and the terminal member 3813 has projections 3813a and 3813b.

The terminal 3814 has projections 1814a which the coil ends of the phase coils 1211a, 1211b and 1211c are wound around and to be soldered thereto.

Figure 29:
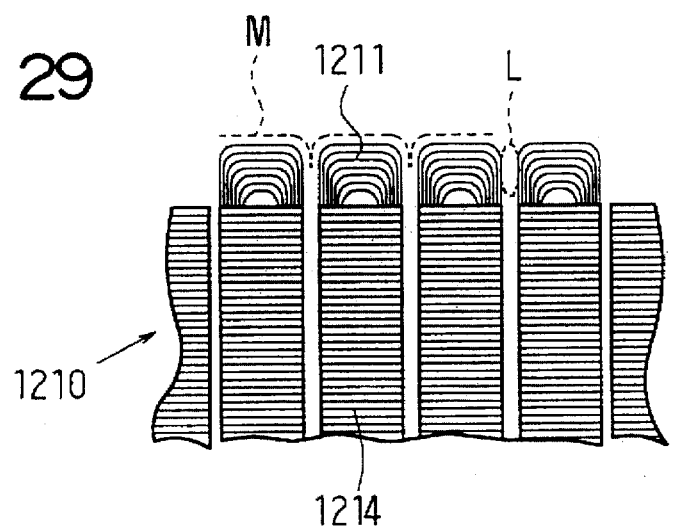
FIG. 29 is a view illustrating coil end portions of the system according to the eleventh embodiment viewed from an outer circumference.

In this embodiment, coil ends of the phase coils do not overlap with each other as shown in FIG. 29 so that a structure of the coil ends more resistant to the centrifugal force and exposed to more cooling air can be provided. Since three teeth 1214 are disposed in a two-pole pitch of the second rotor 1310 as shown in FIGS. 24 and 25, the coil pitch between each two of the U, V and W-phase coils is 2/3 pole pitch. Accordingly, electric loss of the phase coils reduces to 2/3 when the same amount of the current is supplied to the phase coil as compared with the phase coils having one pole pitch therebetween.

Moreover, with use of the terminal 3810 manufacturing efficiency can increase and lead wire can be made shorter.

(Twelfth Embodiment)

A T-S converter according to a twelfth embodiment is described with reference to FIGS. 30 and 31.

Figure 30:
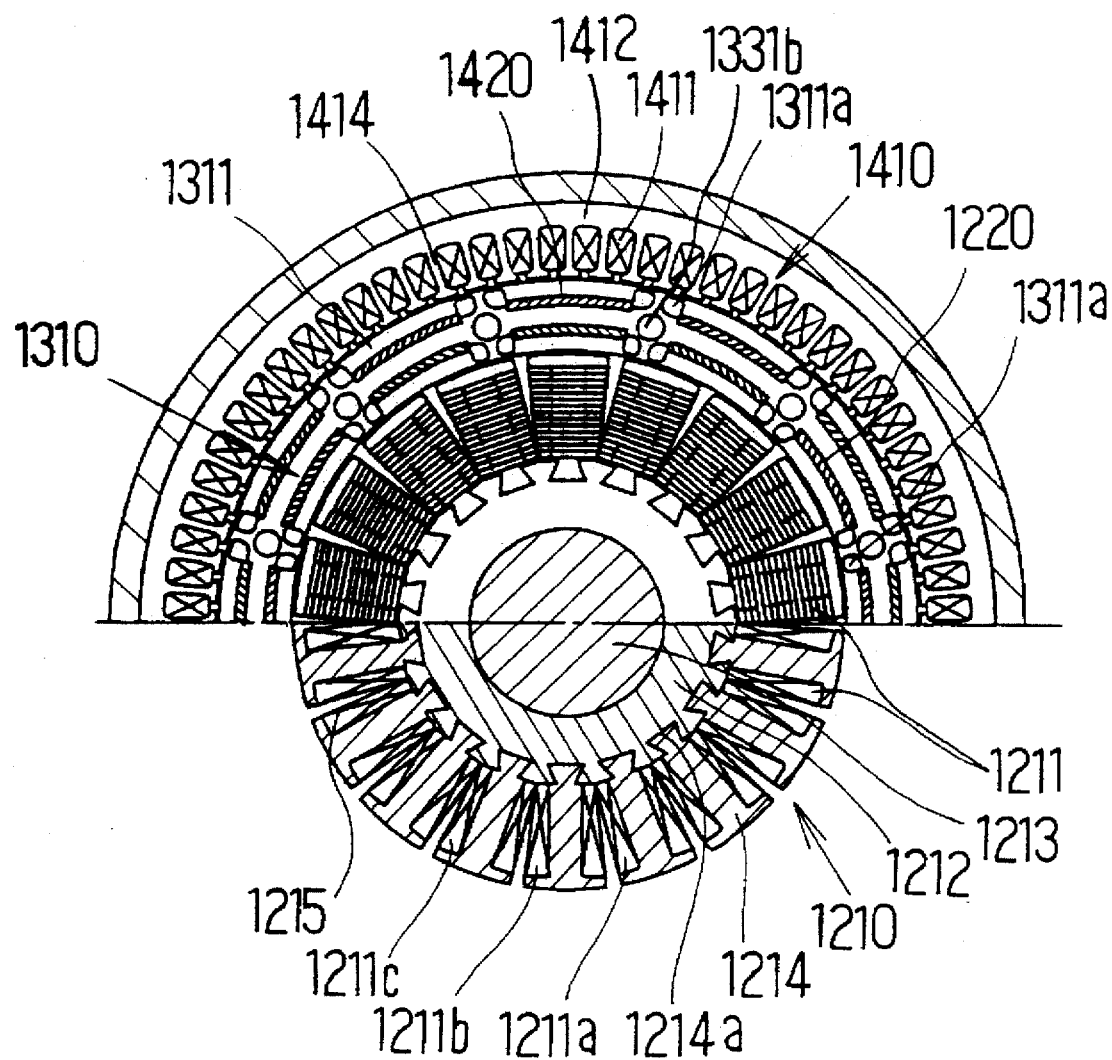
FIG. 30 is a sectional plan view illustrating a main part of a driving system according to a twelfth embodiment of the present invention.
Figure 31:
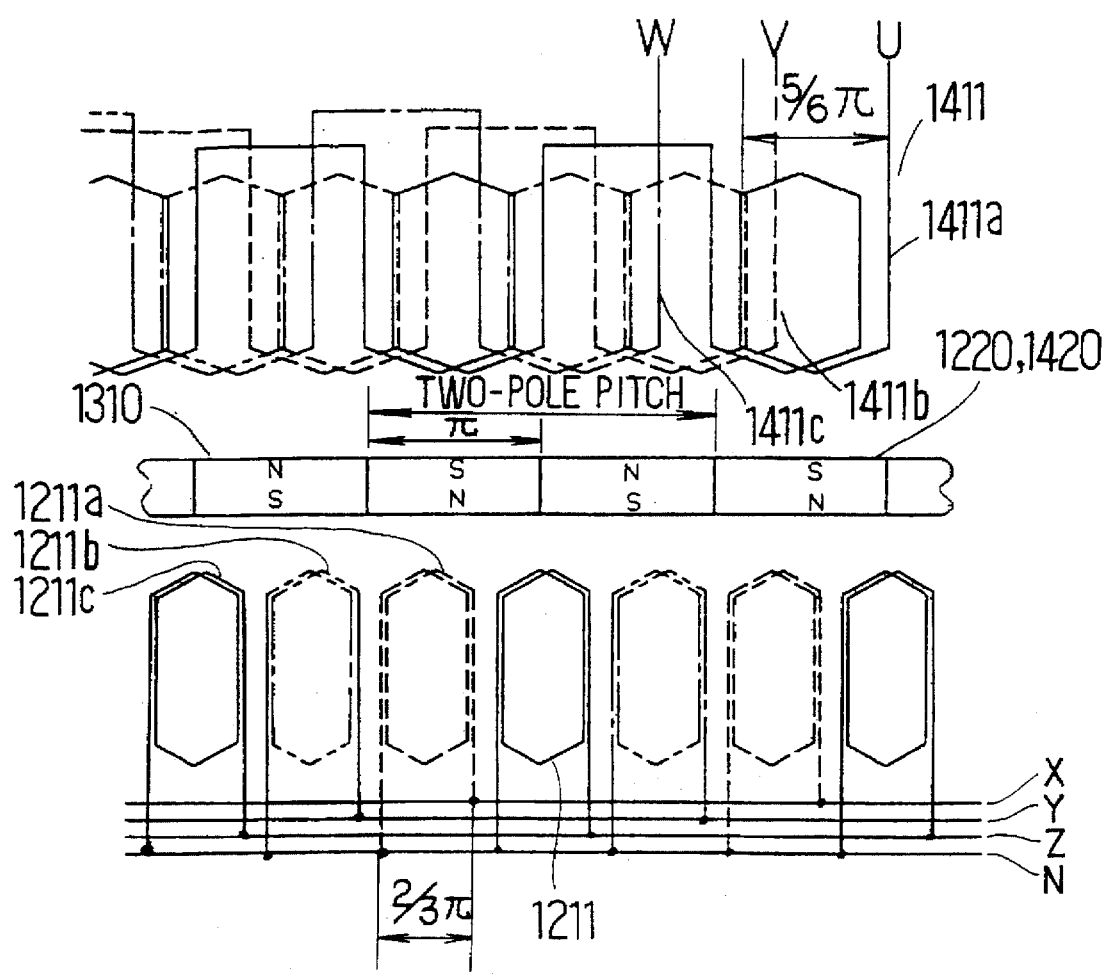
FIG. 31 is a schematic view showing relationship between the coil pitch and the pole pitch of a second rotor of the T-S converter of the system according to the twelfth embodiment.
Figure 32:
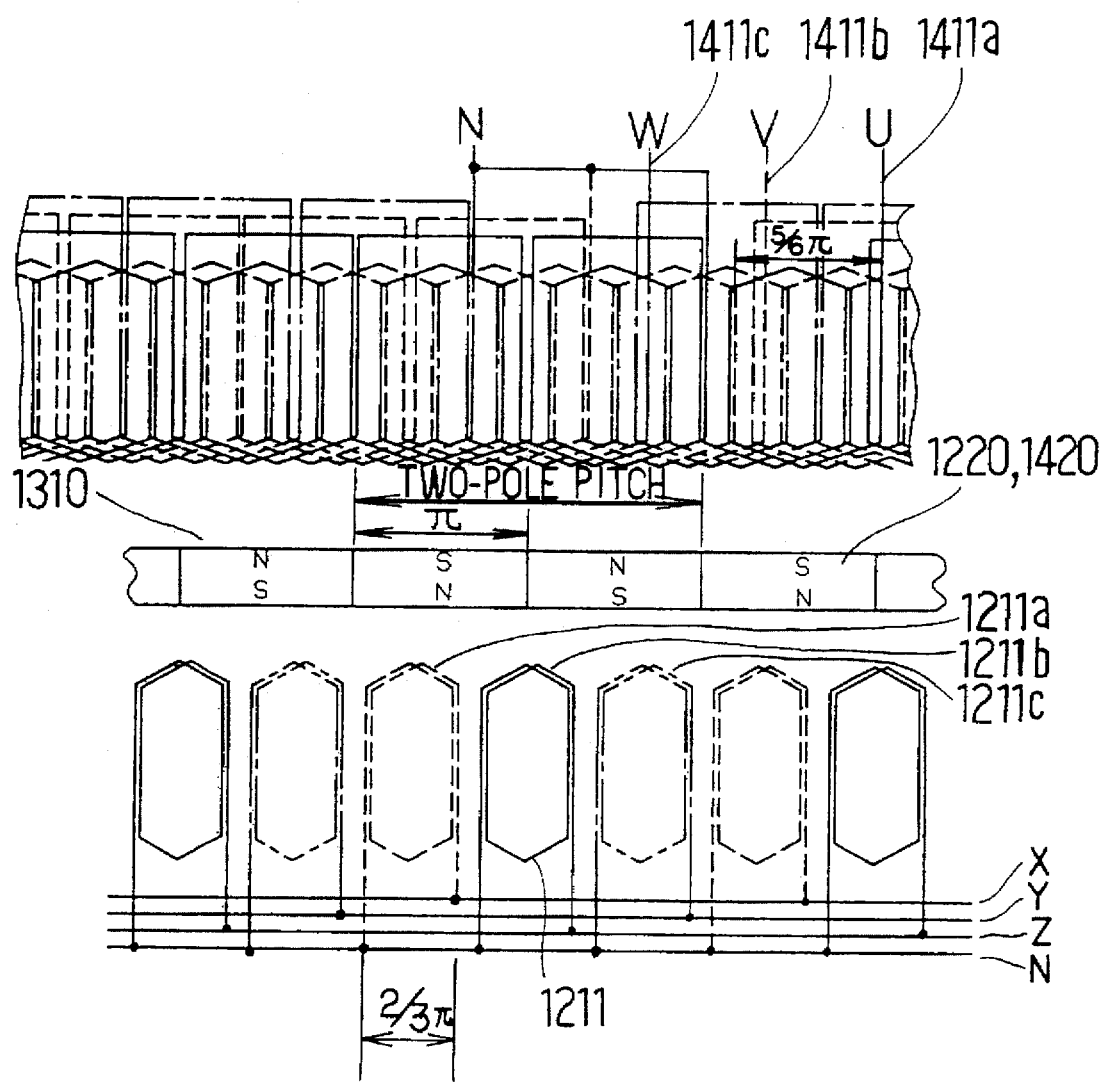
FIG. 32 is a schematic view showing relationship between the coil pitch and the pole pitch of a second rotor of the system according to a variation of the twelfth embodiment.

The stator 1410 has twelve teeth 1414 in each two-pole pitch formed by the permanent magnets 1420 which are disposed circumferentially on opposite cylindrical surfaces of the second rotor 1310 as shown in FIG. 30. Each phase coil of the second control coil is wound around each five teeth and two phase coils of are disposed in each two-pole pitch so that one is shifted by one tooth next to another to form a 5π/6-short-pitch-distributed winding as shown in FIG. 31. FIG. 32 shows another group of coils are added to the group of coils shown in FIG. 31 by shifting one tooth.

This structure is effective to reduce the ripples of generated voltage wave and harmonic component (especially, fifth and seventh harmonic component) of the magnetic flux wave and the torque ripple. Further, the ECU 500 detects the torque ripple of the rotating speed of the second rotor by the resolver 1912 and controls the torque control section 1400 to eliminate the torque ripple.

(Thirteenth Embodiment)

Figure 33:
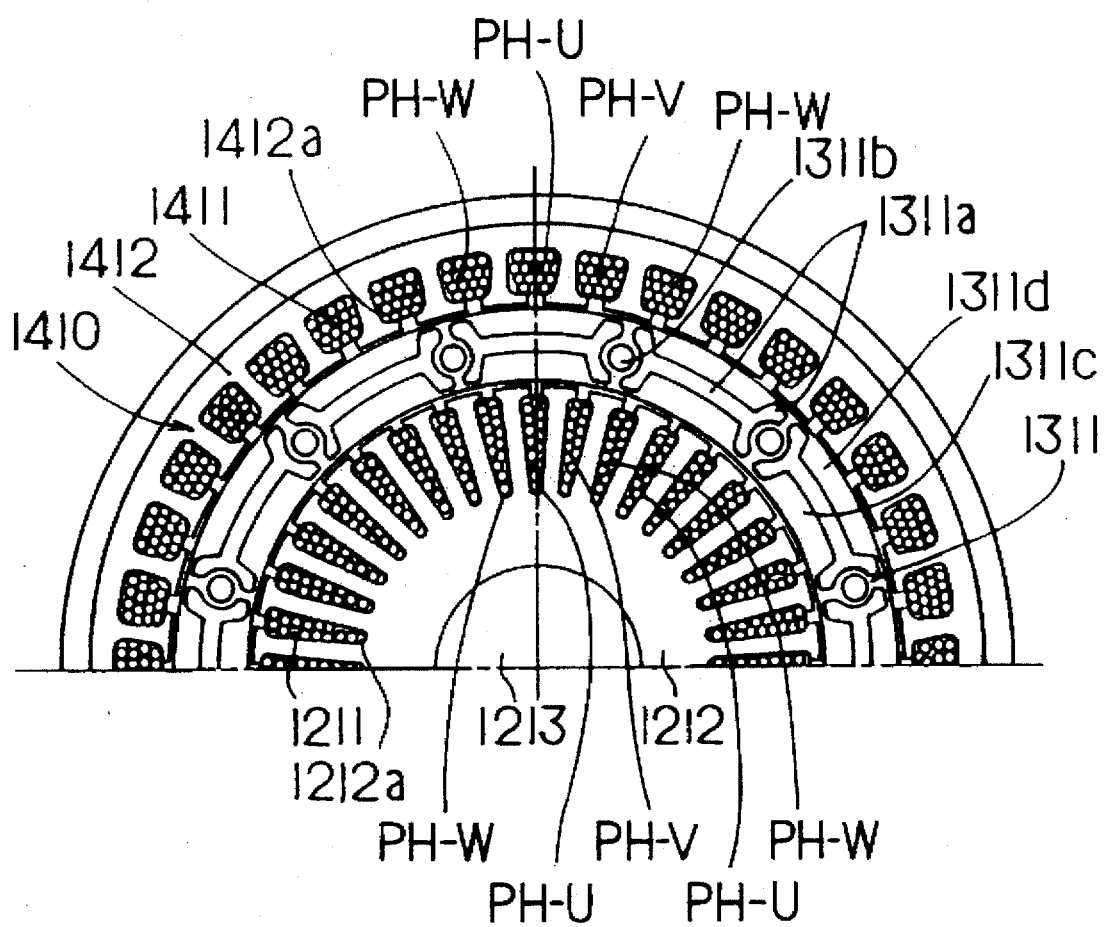
FIG. 33 is a sectional plan view illustrating a main part of a driving system according to a thirteenth embodiment of the present invention.

The first rotor 1210, the second rotor 1310 and the stator 1410 of a T-S converter according to a thirteenth embodiment is described with reference to FIG. 33.

The first rotor 1210 has 36 slots 1212a disposed at each angle 10° in which U, V and W-phase coils are wound. The rotor yoke 1311 of the second rotor 1310 has poles 1311c made of ferromagnetic material disposed at an equal interval on the inner periphery of the cylindrical portion. Air gaps 1311a are formed in the radially middle position of the cylindrical portion to prevent leaking of the magnetic flux from the adjacent poles 1311c. Twelve through holes 1311b are also formed at every 30° in angle to receive the bolts 1333 (FIG. 20) therein and to fasten the frames 1331 and 1332.

The poles 1311c, the rotor core 1212 and the control coil 1211 compose a magnetic circuit. Thus, current supplied to the control coil 1211 is controlled by the inverter 200, so that the rotational speed of the output shaft of the speed control section 1200 is controlled Magnetic poles 1311d made of ferromagnetic material are disposed at an equal interval on the outer periphery of the cylindrical portion of the rotor yoke 1311 in the same manner as the magnetic poles 1311c. In this embodiment, the magnetic poles 1311c and 1311d are made from the same laminated core of the ferromagnetic material. The poles 1311c and 1311d are located at the same circumferential position to have the same phase angle in this embodiment, However, they can be located at different positions or disposed at different intervals as far as they can form magnetic circuits with the first rotor 1210 and with the stator 1410 respectively.

The second rotor 1310 has 36 slots disposed at an angular interval 10° to form the second magnetic circuit with the magnetic poles 1311d of the second rotor 1310. The control coil 1411 is composed of U, V and W-phase coils. Current supplied to the control coil 1411 is controlled by the inverter 400 to control the rotation of the second rotor 1310, thereby controlling the output torque of the torque control section 1400.

Operation of the T-S converter according to thirteenth embodiment of the present invention is described with reference to FIGS. 34A–34D next. FIG. 34

Figure 34A:
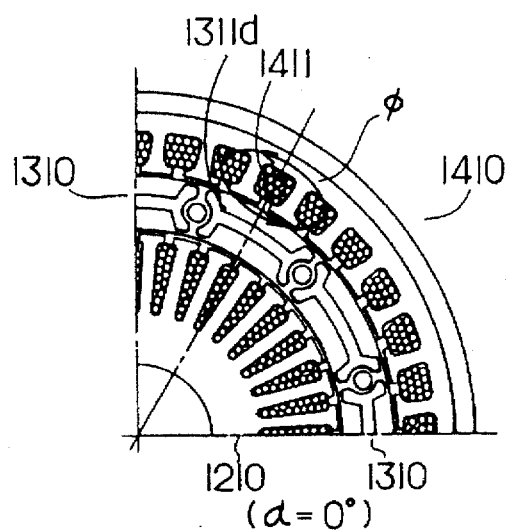
FIGS. 34A, 34B, 34C and 34D are explanatory plan views illustrating a main part of the driving system according to the thirteenth embodiment.

FIG. 34A illustrates the magnetic flux Φ generated by the current supplied to the stator control coil 1411 when a center line (hereinafter referred to as the first center line) of the magnetic pole 1311d is located at the center of the current supplied to the control coil 1411. The magnetic resistance of this position becomes smaller and the inductance L of the control coil 1411 becomes larger (Lmax).

Figure 34B:
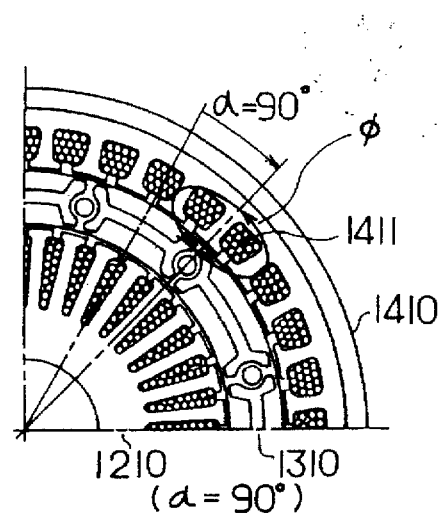

FIG. 34B illustrates the magnetic flux Φ generated by the current supplied to the stator control coil 1411 when a center line (hereinafter referred to as the second center line) of the portion between the adjacent magnetic poles is located at the center of the current supplied into the control coil. In this position, the rotor stays in an unstable state and the magnetic resistance of this position becomes larger and the inductance L of the control coil 1411 becomes smaller (Lmin). Therefore, more ampere-turn (AT) is necessary to provide the same amount of the magnetic flux Φ.

Figure 34C:
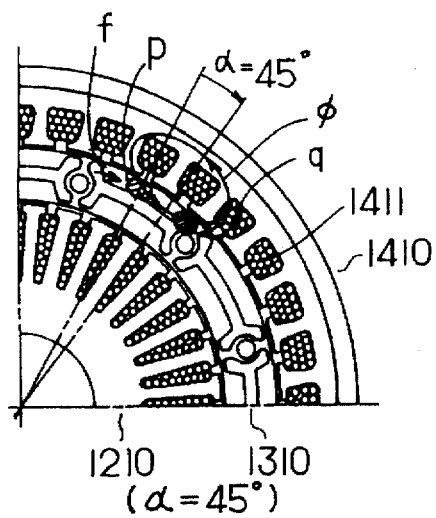

FIG. 34C illustrates the magnetic flux Φ generated by the current supplied to the stator control coil 1411 when a center line of the portion between the first and second center lines is located at the center of the current supplied to the control coil 1411. In this position, a portion indicated by p requires less ampere-turn and a portion indicated by q requires more ampere-turn to have the same amount of the magnetic flux Φ and, accordingly, a torque (reluctance torque)f is generated to rotate the second rotor 1310 in the direction to reduce the ampere-turn. That is, the stator 1410 and the magnetic poles 1311d of the second rotor 1310 compose a reluctance motor. In the same manner, the first rotor 1210 and the magnetic poles 1311c of the second rotor 1310 compose another reluctance motor.

Figure 34D:
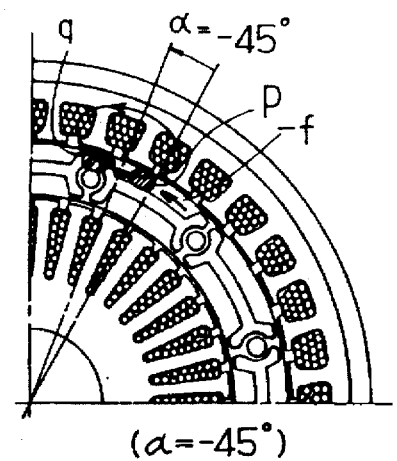

FIG. 34d illustrate the magnetic flux Φ generated by the current supplied to the stator control coil 1411 when a center line of the portion opposite the portion in FIG. 34c between the first and second center lines is located at the center of the current supplied to the control coil 1411.

Figure 35:
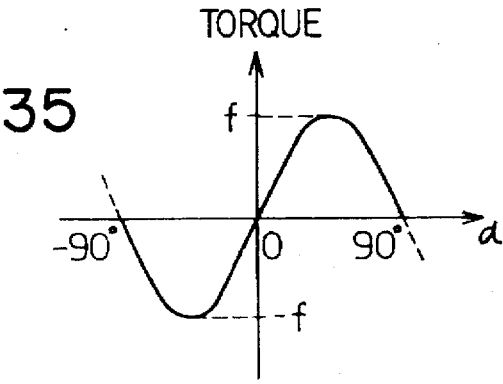
FIG. 35 is a graph showing the relationship between the torque generated by the second rotor and the phase angle of the supply current.

FIG. 35 shows the relationship between the phase angle α of the supply current and the generated torque. It is noted that as the magnetic resistance increases when the current is supplied to the control coil 1411, the generated torque f increases. The reluctance torque is given by the following equation E6.

$$T = \alpha \cdot Pn(Lmax - Lmin)I^2 \sin 2\theta$$

where Pn is the number of pair of poles, I is the current supplied to the control coil, θ is the electric angle between the current and the magnetic field.

It is noted that as the difference between Lmax and Lmin increases, the torque gets larger, and that Lmax >1.5 Lmin is most effective.

(Fourteenth Embodiment)

Figure 36:
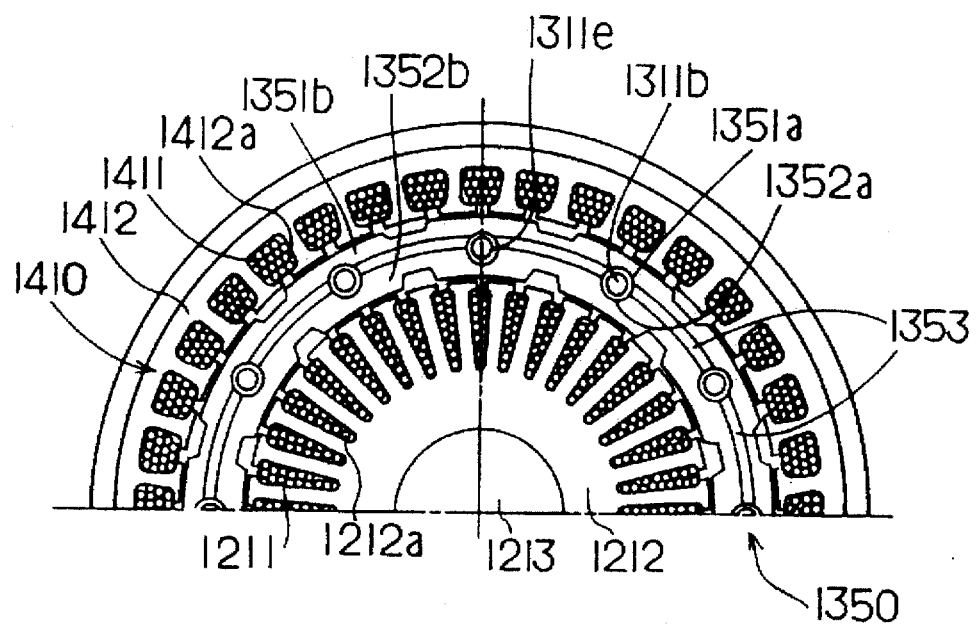
FIG. 36 is a sectional plan view illustrating a main part of a driving system according to a fourteenth embodiment of the present invention.

A T-S converter according to a fourteenth embodiment of the present invention is described with reference to FIG. 36.

The second rotor 1310 has pole members 1351b and 1352b which are separately made from laminated sheets of ferromagnetic material having the permeability μ of more than 2000 and non-magnetic tubes such as a stainless tubes 1311e which are press-fitted into gaps between grooves 1351a and 1352a formed at interface portions of the pole members 1351b and 1352b, thereby fastening both members in position. The pole member 1351b has recesses which open to the first rotor 1210 at an equal interval and the pole member 1352b has recesses which open to the second rotor 1310 at an equal interval. A plurality of through bolts 1311b are inserted into the tubes 1311e to fasten the frames as described before. A plurality of air gaps 1353 are formed between both pole members 1351b and 1352b to prevent the magnetic interference from each other.

(Fifteenth Embodiment)

Figure 37:
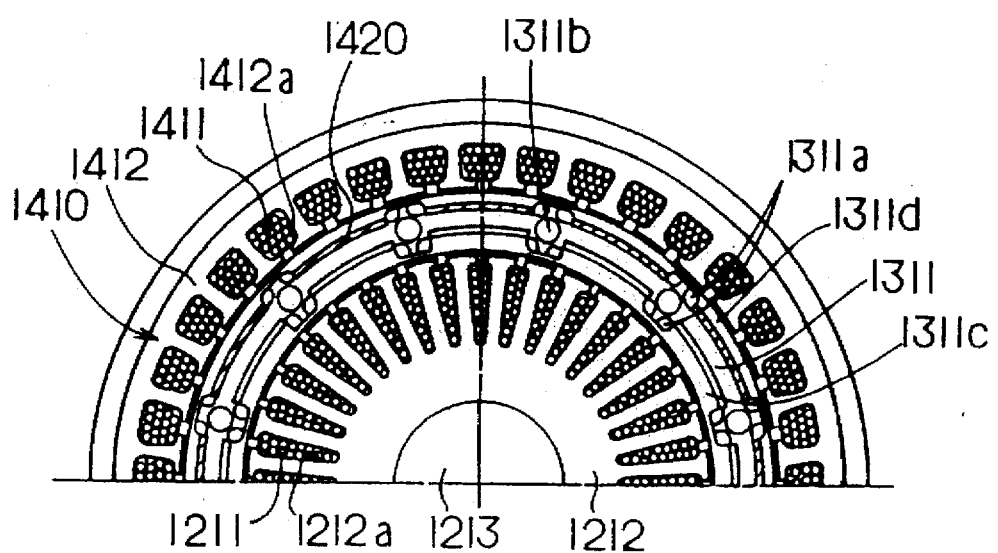
FIG. 37 is a sectional plan view illustrating a main part of a driving system according to a fifteenth embodiment of the present invention.

A T-S converter according to fifteenth embodiment is described with reference to FIG. 37. Each of the magnetic poles 1311d of the second rotor 1310 is composed of a ferromagnetic member and a permanent magnet 1420, which is disposed circumferentially on the outer periphery of the second rotor at an equal interval.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A system for driving a vehicle which converts electric power of a battery and mechanical power of an engine into driving power of an output shaft at a prescribed rotating torque rotational speed, said system comprising:
   a housing;
   a bearing;
   a first rotor having a first control coil supported by said bearing for generating a rotating magnetic field;
   a stator having a second control coil for generating a rotating magnetic field; and
   a second rotor disposed between said first rotor and said stator and having a first plurality of permanent magnets for providing magnetic field interlinking said first control coil and a second plurality of permanent magnets for providing magnetic field interlinking said second control coil, said second rotor disposed coaxially with said first rotor to rotatably support said first rotor through said bearing;
   wherein said first rotor and said second rotor form a first electric synchronous machine, and said stator and said second rotor form a second electric synchronous machine.

2. A system as claimed in claim 1, wherein said first rotor is connected to said engine and said second rotor is connected to said output shaft.

3. A system as claimed in claim 1, wherein said second rotor is connected to said engine and said first rotor is connected to said output shaft.

4. A system as claimed in claims 1 further comprising a speed reduction means connected in series with said output shaft.

5. A system for converting electric power of a battery and mechanical power of an engine into driving power of an output shaft at a prescribed rotating torque and rotational speed, said system comprising:
   a housing;
   a first rotor having a first control coil;
   a first stator fixed to said housing having a second control coil;
   a second rotor disposed between said first rotor and said first stator and having a first magnetic member for providing magnetic field interlinking said first control coil and a second magnetic member for providing magnetic field interlinking said second control coil;
   a first inverter, connected to said battery for controlling electric power to be supplied to said first control coil according to angular speed difference between said first and second rotors;
   a second inverter, connected between said second control coil and said battery, for controlling electric power to be supplied to said second control coil according to torque generated between said first stator and said first rotor;
   a second stator fixed to said housing and having a coil connected to said first inverter; and
   a third rotor carried by said first rotor and disposed to couple with said second stator, said third rotor having a coil connected to said first control coil for transmitting said electric power controlled by said first inverter from said coil of said second stator to said first control coil.

6. A system as claimed in claim 5, wherein said first rotor and said second rotor composes a multi-phase electric rotary machine, said second rotor and said first stator composes a multi-phase rotary machine and said third rotor and said second stator composes a multi-phase rotary electric machine.

7. A system as claimed in claim 6, wherein said first rotor, said second rotor and said first stator are disposed coaxially with each other.

8. A system as claimed in claim 5 further comprising a multi-phase terminal and capacitors, wherein said first control coil and said coil of said third rotor are connected to said multi-phase terminal and one phase of said terminal is connected to another through one of said capacitor.

9. A system as claimed in claim 5 further comprising a multi-phase terminal including a neutral-point terminal and capacitors, wherein said first control coil and said coil of said third rotor are connected to said multiple phase terminals and each of said phase terminals is connected to said neutral point terminal through one of said capacitors.

10. A system as claimed in claim 9, wherein said first rotor, said second rotor and said first stator are disposed coaxially with each other on a common plane.

11. A system as claimed in claim 5, wherein at least one of said first and second magnetic members comprises permanent magnets.

12. A system for driving a vehicle which converts electric power of a battery and mechanical power of an engine into driving power of an output shaft at a prescribed rotating torque and rotational speed, said system comprising:
   a housing;
   a first rotor having a permanent magnet for providing a magnetic field;
   a stator fixed to said housing and having a second control coil for providing a second rotating magnetic field;
   a second rotor disposed between said first rotor and said stator and having a first control coil interlinking said magnetic field of said first rotor and a permanent magnet for providing a magnetic field interlinking said second control coil, said second rotor disposed coaxially with said first rotor to rotatably support said first rotor; and
   means having slip rings fixed to said second rotor and brushes fixed to said housing for supplying electric power from said battery to said first coils;
   wherein said first rotor and said second rotor form a first electric synchronous machine, and said stator and said second rotor form a second electric synchronous machine.

13. A system as claimed in claim 12 further comprising:
   first means for detecting rotational speed of said first rotor relative to said housing; and
   second means for detecting rotational speed of said second rotor relative to said housing;
   wherein said first and second means are disposed along an axis of said first rotor on an end of said first rotor opposite said slip rings.

14. A system as claimed in claim 12, wherein said second rotor includes a non-magnetic ring member disposed between said first control coil and said magnetic member and said magnetic member comprises a permanent magnet.

15. A system for driving a vehicle which converts electric power of a battery and mechanical power of an engine into driving power of an output shaft at a prescribed rotating torque and rotational speed, said system comprising:

a speed-torque converter having a housing, an input shaft disposed in said housing and connected to said engine, a first rotor having a first control coil, a stator fixed to said housing and having a second control coil disposed around said first rotor, a second rotor disposed between said stator and said first rotor and having a first permanent for generating magnetic field interlinking said first control coil and a second permanent magnet for generating magnetic field interlinking said second control coil, said output shaft disposed coaxially with said input shaft;

first means for detecting rotational positions of said first rotor and said second rotor;

second means, connected to said battery, said first control coil and said first means, for supplying said first control coil with electric current according to a difference in said rotational position between said first and second rotors; and third means, connected to said battery, said second control coils and said first means, for supplying said second control coils with electric current according to said rotation of second rotors.

16. A system as claimed in claim 15, said first means detects absolute rotational speed of said first and second rotors.

17. A system as claimed in claim 15, wherein said first rotor has a plurality of salient teeth disposed to face said first magnetic member and said first control coil is composed of coils each of which is wound around one of said salient teeth in concentrated winding style.

18. A system as claimed in claim 17, wherein said first rotor has a plurality of multi-phase coils and ring-shaped terminal members connected to said multi-phase coils.

19. A system as claimed in claim 17, wherein said input shaft and said output shaft are disposed coaxially with each other.

20. A system as claimed in claim 17, wherein said first control coil comprises three-phase coils and said salient teeth are disposed on outer circumference of said first rotor so that three teeth are located in a two-pole pitch of said first magnetic member of said second rotor.

21. A system as claimed in claim 17 further comprising means for eliminating torque ripple of said second rotor.

22. A system as claimed in claim 21, wherein said stator has twelve teeth in each two-pole pitch of said second magnetic member of said second rotor; and each of said phase coils of said second control coil is wound around each five teeth.

23. A system for driving a vehicle which converts electric power of a battery and mechanical power of an engine into driving power of an output shaft at a prescribed rotating torque and rotational speed, said system comprising:

a speed-torque converter having a housing, an input shaft disposed in said housing and connected to said engine, a first rotor having a first control coil, a stator fixed to said housing and having a second control coil disposed around said first rotor, a second rotor disposed between said stator and said first rotor and having a first ferromagnetic member for generating a first magnetic field interlinking said first control coil and a second ferromagnetic member for generating magnetic field interlinking said second control coil, said output shaft disposed coaxially with said input shaft; wherein said first and second ferro-magnetic members provide variable magnetic resistance to change inductances of said first and second control coils when they rotate; thereby forming a pair of electric reluctance motors in combination with said first control coil and said second control coil.

24. A system as claimed in claim 23, wherein said first magnetic member and said first rotor compose a reluctance motor; and said second magnetic member and said stator compose another reluctance motor.

25. A system as claimed in claim 23, wherein said inductance of said first control coil has a maximum inductance and a minimum inductance and said maximum inductance is larger more than one and a half times of said minimum inductance, and said inductance of said second control coil has a maximum inductance and a minimum inductance and said maximum inductance is larger more than one and a half times of said minimum inductance.

26. A system as claimed in claim 23, wherein said first and second magnetic member are made of magnetic material having permeability more than 2000.

27. A system as claimed in claim 23, wherein at least one of said first and second magnetic members comprises laminated ferromagnetic sheets.

* * * * *